July 15, 1947.　　　　R. B. JOHNSON　　　　2,424,097
PUNCHING MACHINE
Filed Sept. 5, 1945　　　21 Sheets-Sheet 1

INVENTOR
R. B. JOHNSON
BY
ATTORNEY

July 15, 1947.  R. B. JOHNSON  2,424,097
PUNCHING MACHINE
Filed Sept. 5, 1945  21 Sheets-Sheet 2

INVENTOR
R. B. JOHNSON
BY
ATTORNEY

July 15, 1947. R. B. JOHNSON 2,424,097
PUNCHING MACHINE
Filed Sept. 5, 1945 21 Sheets-Sheet 3

INVENTOR
R. B. JOHNSON
BY
ATTORNEY

July 15, 1947.                R. B. JOHNSON                2,424,097
                              PUNCHING MACHINE
                        Filed Sept. 5, 1945          21 Sheets-Sheet 4

INVENTOR
R. B. JOHNSON
BY
ATTORNEY

July 15, 1947.  R. B. JOHNSON  2,424,097
PUNCHING MACHINE
Filed Sept. 5, 1945  21 Sheets-Sheet 7

INVENTOR
R. B. JOHNSON
BY
ATTORNEY

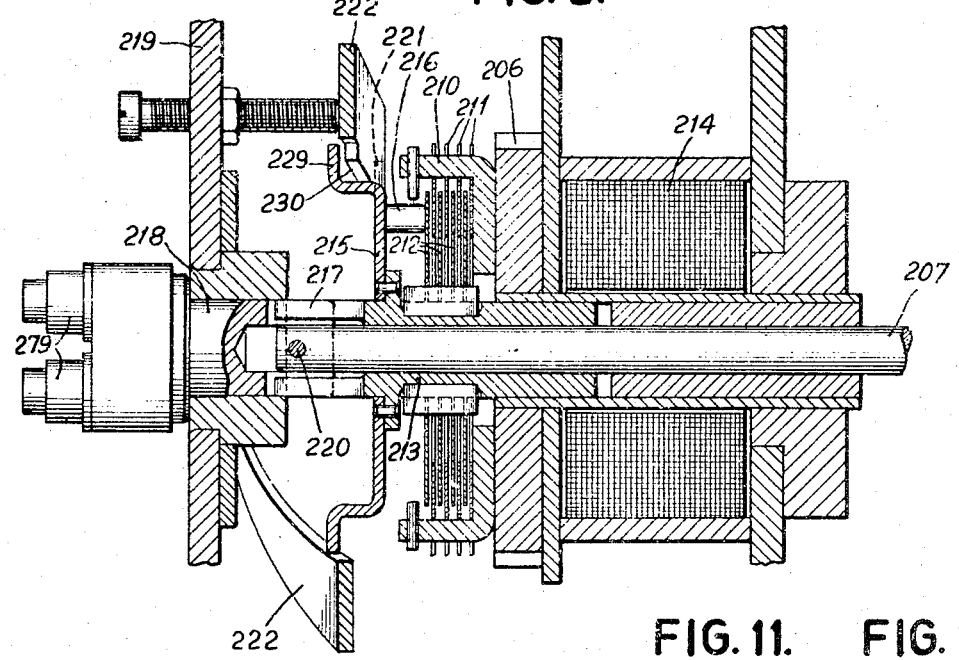
FIG. 9.
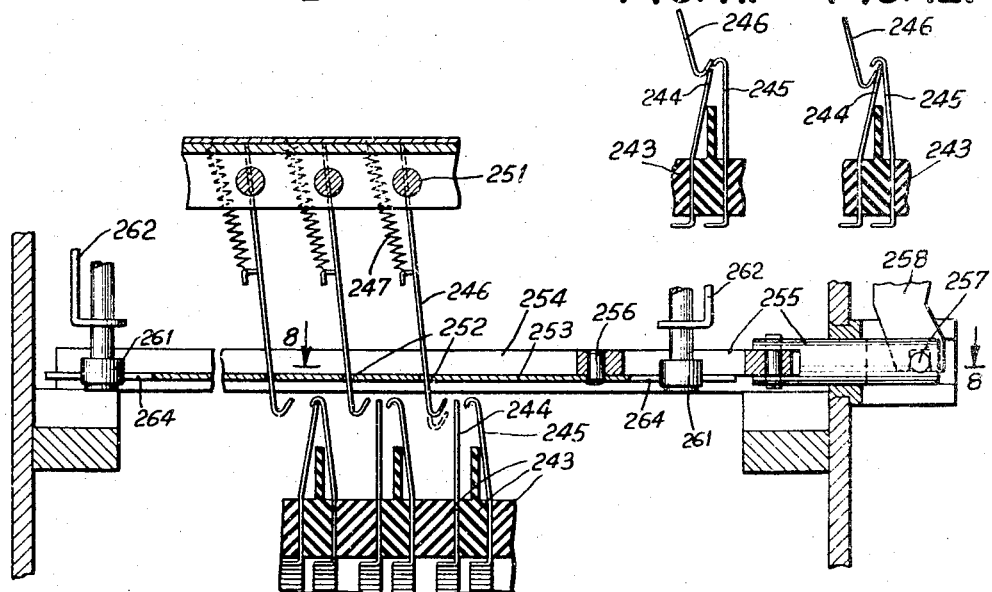
FIG. 11.  FIG. 12.
FIG. 10.

July 15, 1947.  R. B. JOHNSON  2,424,097
PUNCHING MACHINE
Filed Sept. 5, 1945  21 Sheets-Sheet 9

INVENTOR
R.B. JOHNSON
BY
ATTORNEY

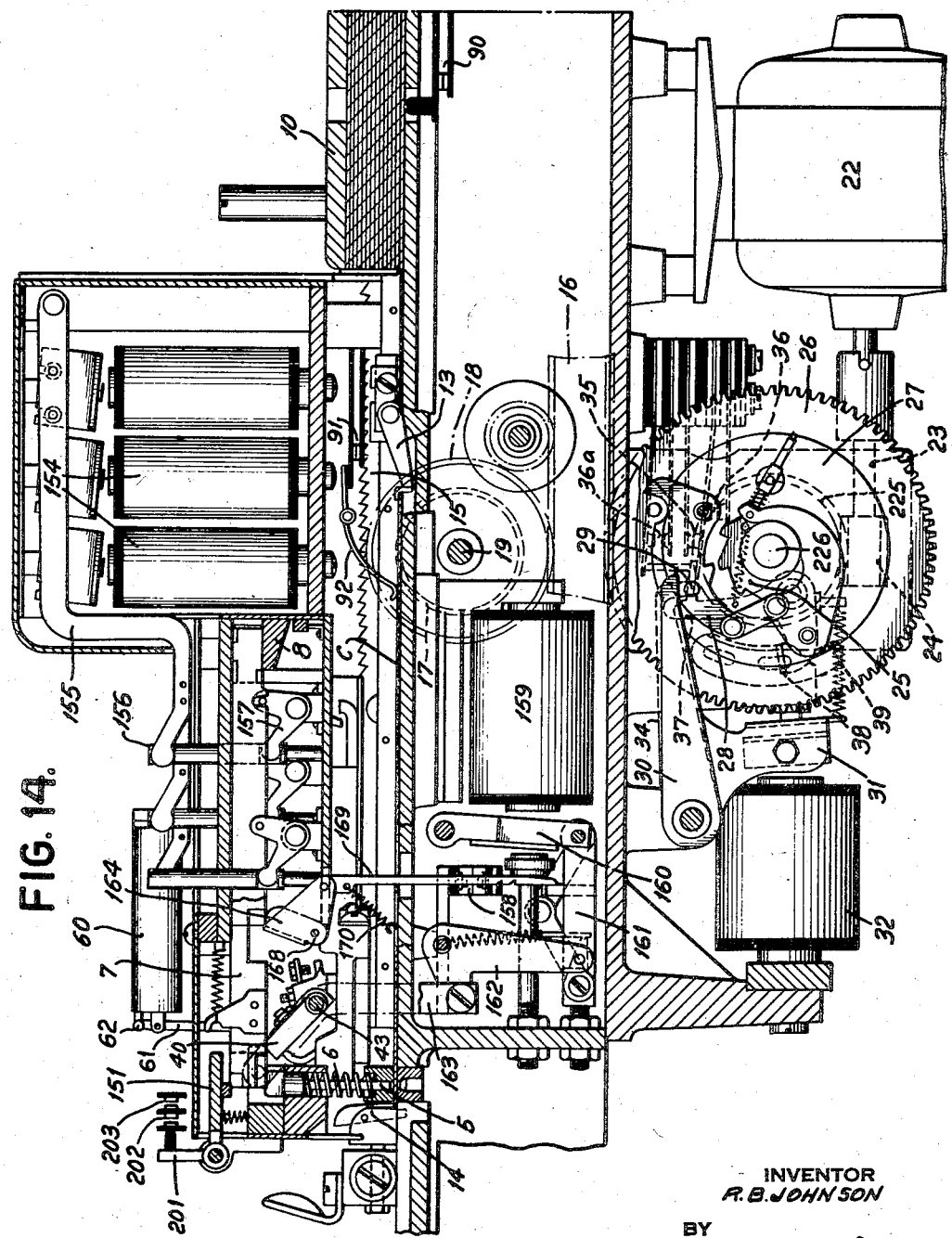

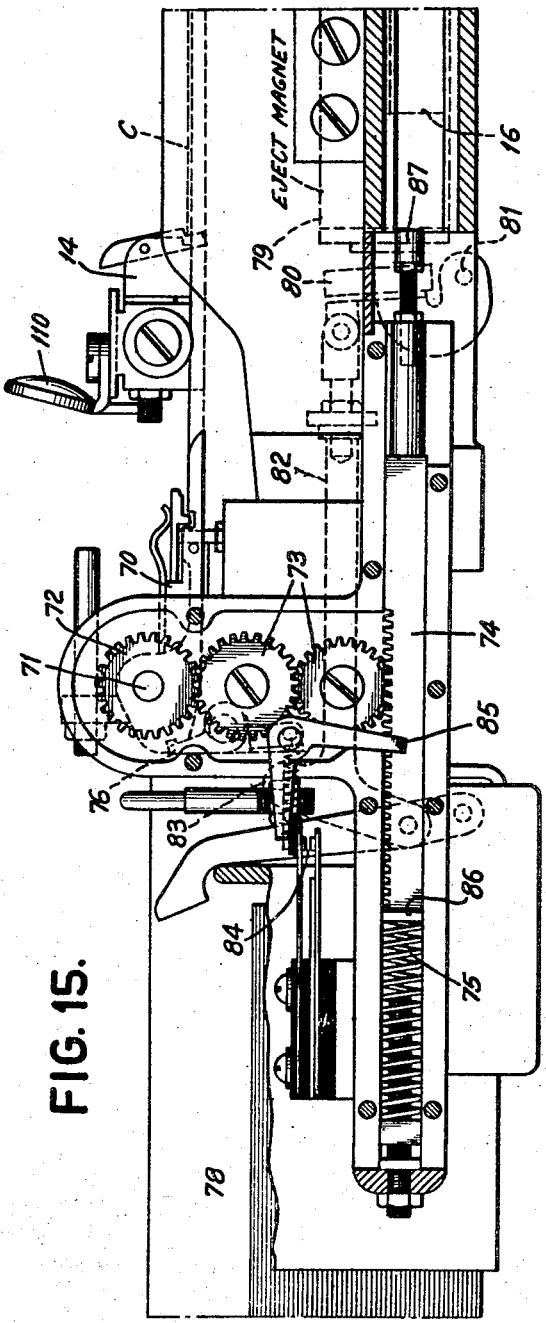
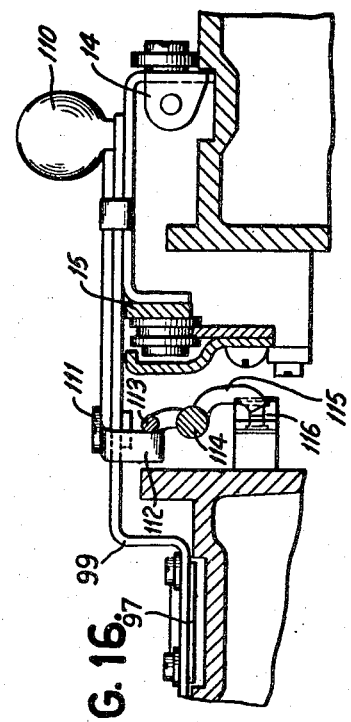

July 15, 1947.  R. B. JOHNSON  2,424,097
PUNCHING MACHINE
Filed Sept. 5, 1945  21 Sheets-Sheet 12

INVENTOR
R. B. JOHNSON
BY
ATTORNEY

July 15, 1947. R. B. JOHNSON 2,424,097
PUNCHING MACHINE
Filed Sept. 5, 1945 21 Sheets-Sheet 13
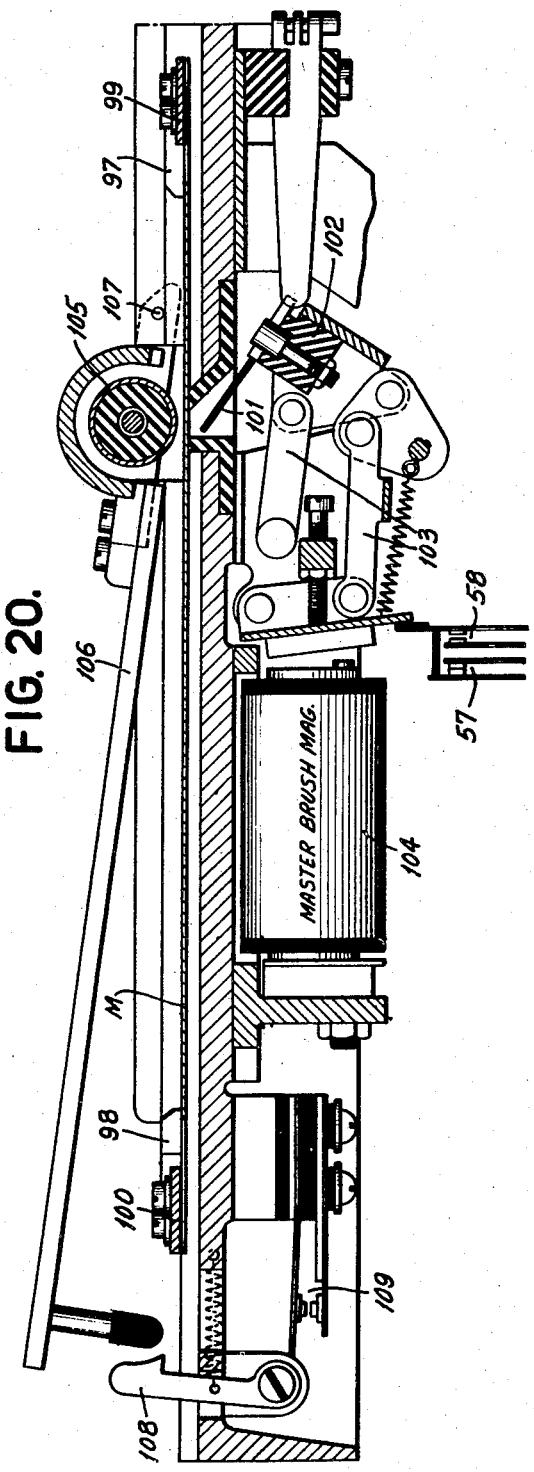
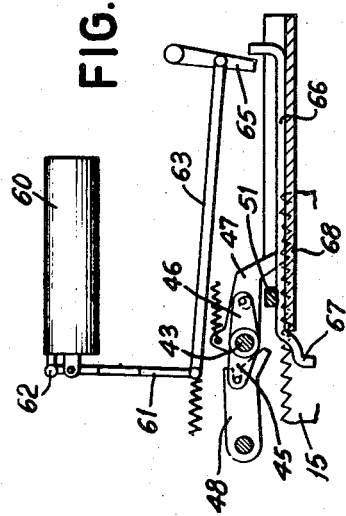
INVENTOR
R. B. JOHNSON
BY
ATTORNEY July 15, 1947.    R. B. JOHNSON    2,424,097
PUNCHING MACHINE
Filed Sept. 5, 1945    21 Sheets-Sheet 14

INVENTOR
R. B. JOHNSON
BY
ATTORNEY

July 15, 1947.  R. B. JOHNSON  2,424,097
PUNCHING MACHINE
Filed Sept. 5, 1945   21 Sheets-Sheet 15
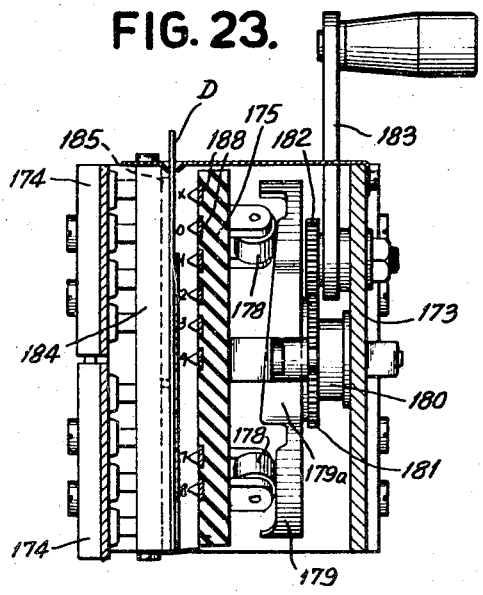
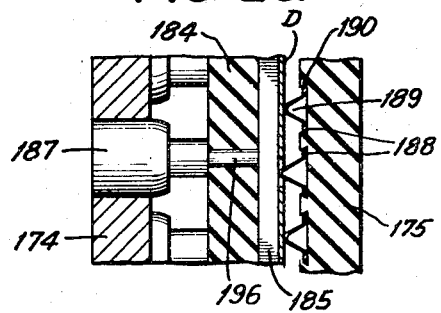
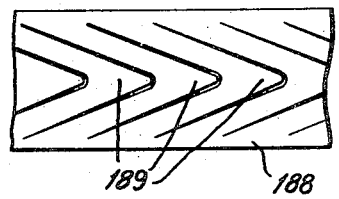
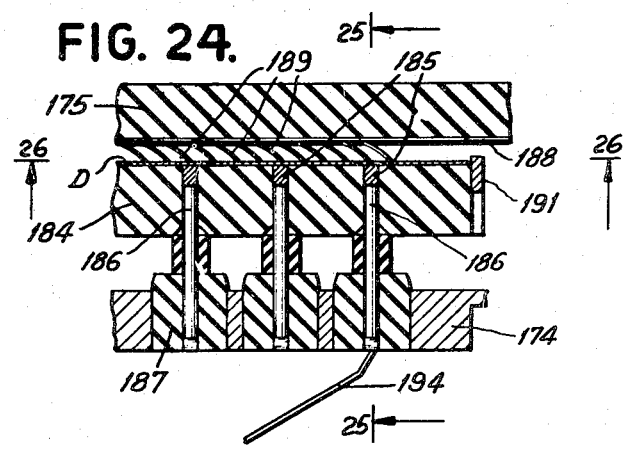
INVENTOR
R. B. JOHNSON
BY
ATTORNEY

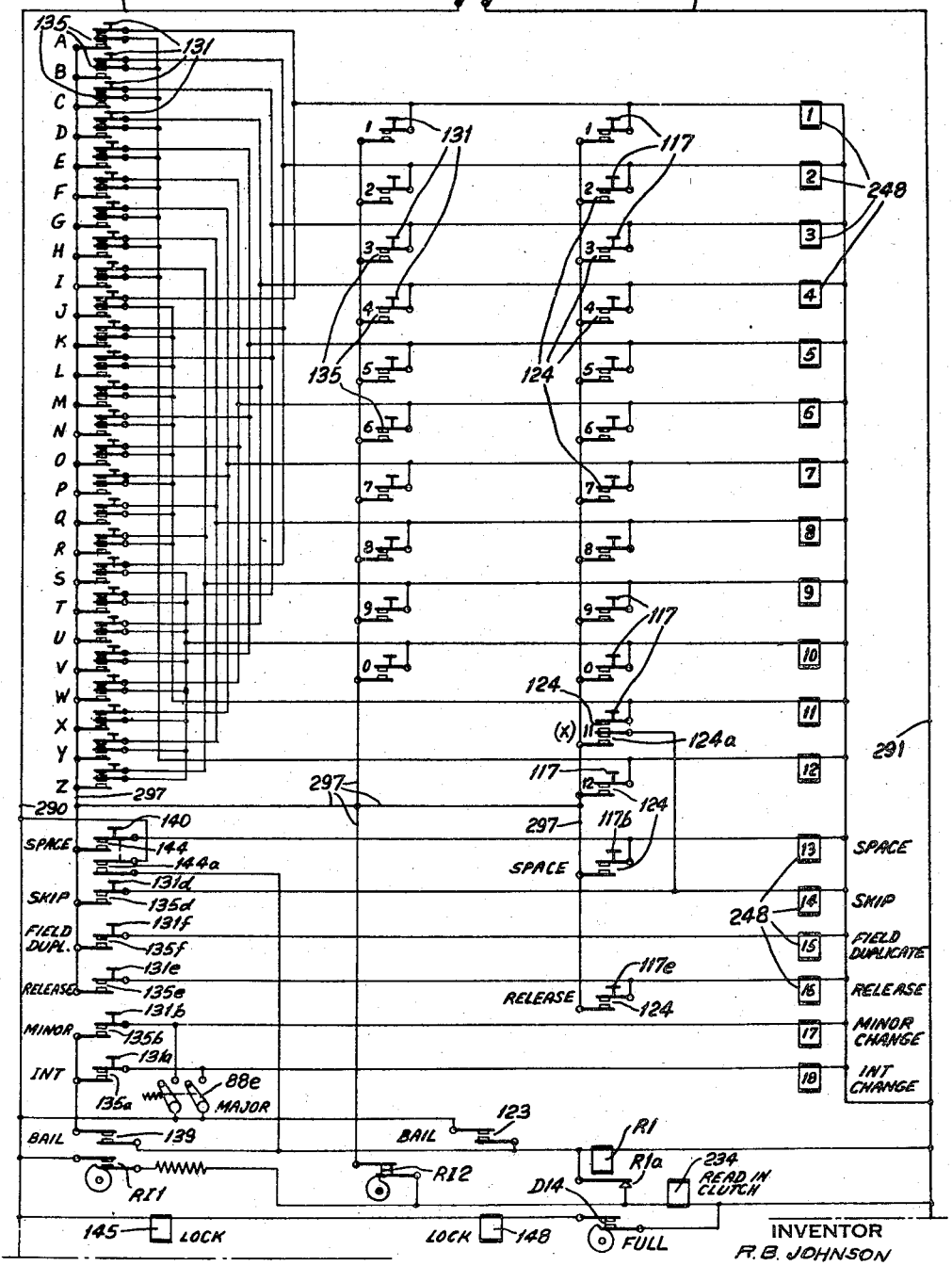

Patented July 15, 1947

2,424,097

UNITED STATES PATENT OFFICE 2,424,097

PUNCHING MACHINE

Reynold B. Johnson, Binghamton, N. Y., assignor to International Business Machines Corporation, New York, N. Y., a corporation of New York Application September 5, 1945, Serial No. 614,505

22 Claims. (Cl. 164—113)

This invention concerns machines for perforating statistical cards of the well known Hollerith type.

A machine of this general type is disclosed in my Patent 2,343,414, granted March 4, 1944, in which there is disclosed a machine in which the overall operating time required to perforate a record card has been materially lessened over prior machines. The present invention contemplates improved mechanism for achieving such time saving operation and also contemplates improvements in operational and structural features whereby more diverse punching problems may be handled and thus the usefulness of the machine is greatly increased.

In carrying out the object of the invention, a so-called storage mechanism is provided which is directly controlled by keys to receive information to be punched and also to receive settings representative of skipping, releasing, spacing, duplicating and duplicate suppression functions to be performed. This storage mechanism in turn controls the operation of the punching machine to effect the punching and other operations in the order in which they were previously set up in the storage mechanism by the operator.

The readin operation during which the operator effects settings in the storage mechanism is independent of the so-called readout operation, during which the storage mechanism controls the punch so that, while the operator is entering certain data, the storage mechanism is controlling the punching in accordance with some previously extended data.

One of the objects of the invention is to provide a flexible control between the readin and readout operations whereby for some types of work the readout operations follow the readin operations in close succession, so that as a value to be punched is read in the next preceding value set up is read out. For other types of operation, adjustable devices are provided to cause the readout operations to be suspended during any selected period until a selected number of entries have been made in the storage mechanism, that is, until a "so-called field" has been set up. The purpose of this delay is to allow the operator a means of error correction. Thus, in rapidly keying the letters of a name or word, the operator is often conscious of having made an error in keying after passing the point at which the error occurred and, if there were no delay between the readin and readout operation, such error would be recorded by the punch with resultant spoilage of a record card. Provision is made in the machine so that, if such an error is noted, the readout devices may be caused to pass by the entries already made for that field without being responsive thereto, and the name or word rekeyed.

A more specific object of the invention is to provide an improved form of storage mechanism in which cancellation of undesired setup data may be rapidly effected by the operation of a single switch, and such operation will cancel out the data in a "field" from the point of error back to the beginning of the field which may be of a variable extent.

A further object of the invention resides in the provision of a pattern or master card for controlling the punching mechanism independently of the key set storage mechanism and novel controls responsive to settings in the storage mechanism for switching the punch control from the storage mechanism to the pattern card.

A still further object of the invention resides in the provision of a control card containing designations which control the points in the operation where suspension of readout for field settings is to commence, the initiation of punching from certain fields of the pattern card and the termination of automatic spacing operations is to be effected.

Another object of the invention resides in the provision of novel checking mechanism effective under conditions wherein punching is to terminate in a predetermined position of the card, for ascertaining whether the correct number of settings have been made in the storage mechanism to effectuate termination at said position and to signal the operator if there is a discrepancy.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1 and 1a taken together constitute an elevational view of the data storage mechanism.

Fig. 2 is an end elevation of the storage mechanism, looking toward the right end of Fig. 1a.

Fig. 3 is a detail of clutch mechanism taken on lines 3—3 of Fig. 1a.

Fig. 4 is a section taken on lines 4—4 of Fig. 1a.

Fig. 5 is a section taken on lines 5—5 of Fig. 1a.

Fig. 9 is a section taken on lines 9—9 of Fig. 3.

Fig. 10 is a section taken on lines 10—10 of Fig. 7.

Fig. 11 is a detail of parts in Fig. 10 in another position.

Fig. 12 is a detail of parts in Fig. 10 in another position.

Fig. 14 is a sectional elevation taken on lines 14—14 of Fig. 6.

Fig. 15 is an elevation looking in the direction of lines 15—15 of Fig. 6.

Fig. 16 is an elevation looking in the direction of lines 16—16 of Fig. 6.

Fig. 19 is a detail of the carriage release mechanism.

Fig. 20 is a sectional elevation taken on lines 20—20 of Fig. 6.

Fig. 23 is a sectional elevation taken on lines 23—23 of Fig. 22.

Fig. 24 is a sectional elevation taken on lines 24—24 of Fig. 22.

Fig. 25 is a sectional elevation taken on lines 25—25 of Fig. 24.

Fig. 26 is a sectional elevation taken on lines 26—26 of Fig. 24.

Figs. 27a to 27d arranged vertically in the order named constitute a wiring diagram of the electric circuits of the apparatus.

Figure 28:
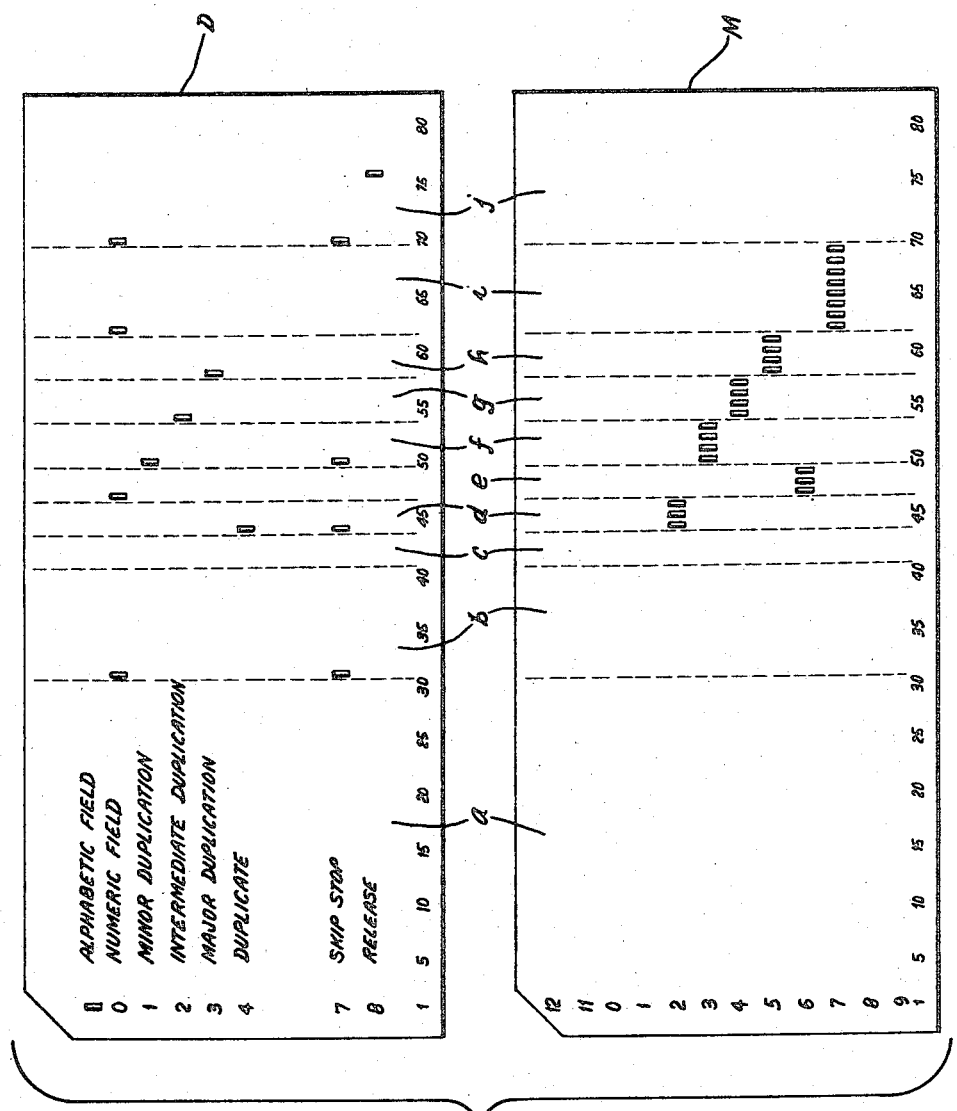

Fig. 28 illustrates a control card and a master card arranged to show the perforations made in related fields for a specific example.

Figure 29:
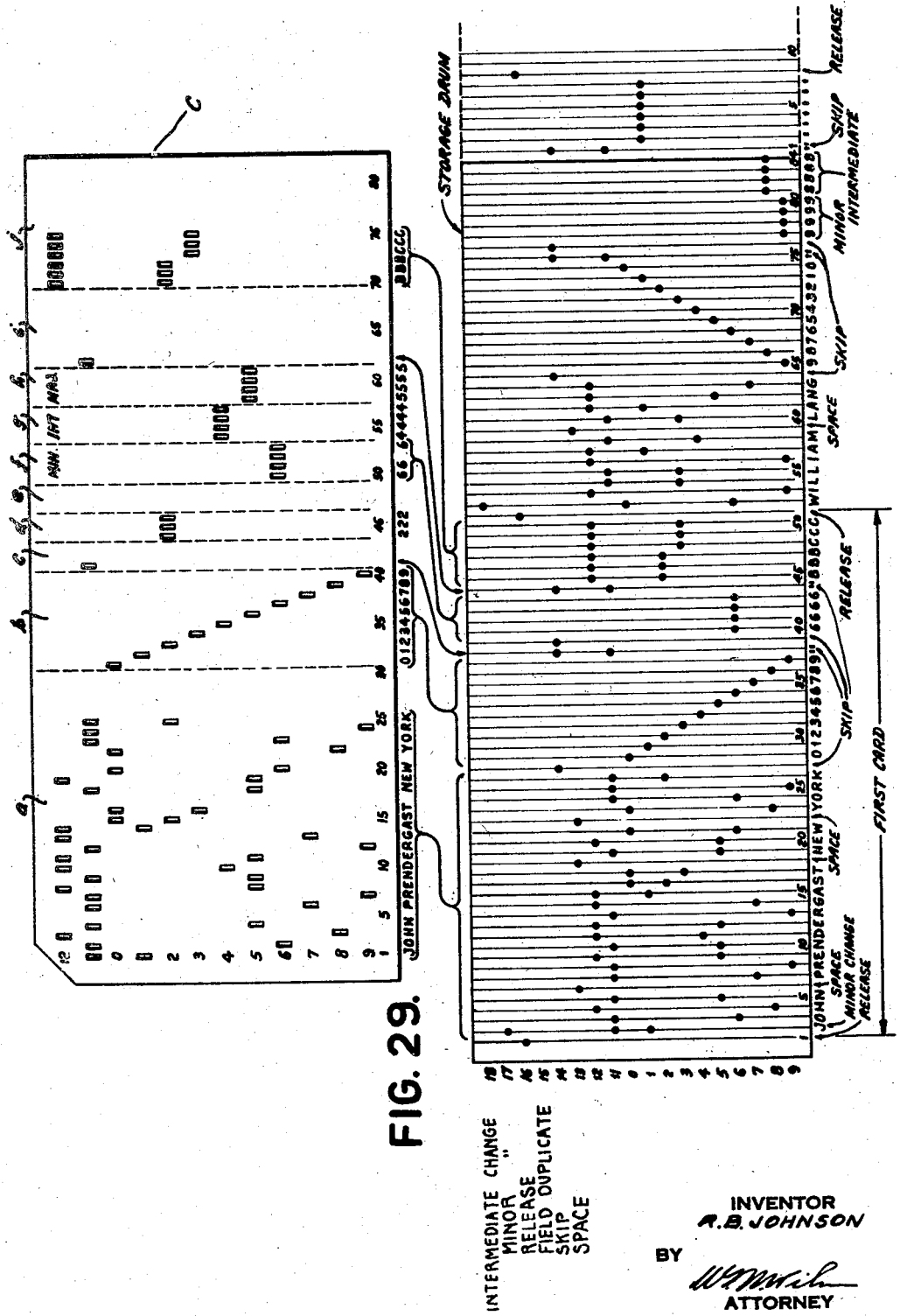

Fig. 29 illustrates a record card perforated in the machine under control of the cards of Fig. 28 and also under control of the storage mechanism, which latter is diagrammatically represented with settings to control operations for the preparation of the card.

Figure 1:
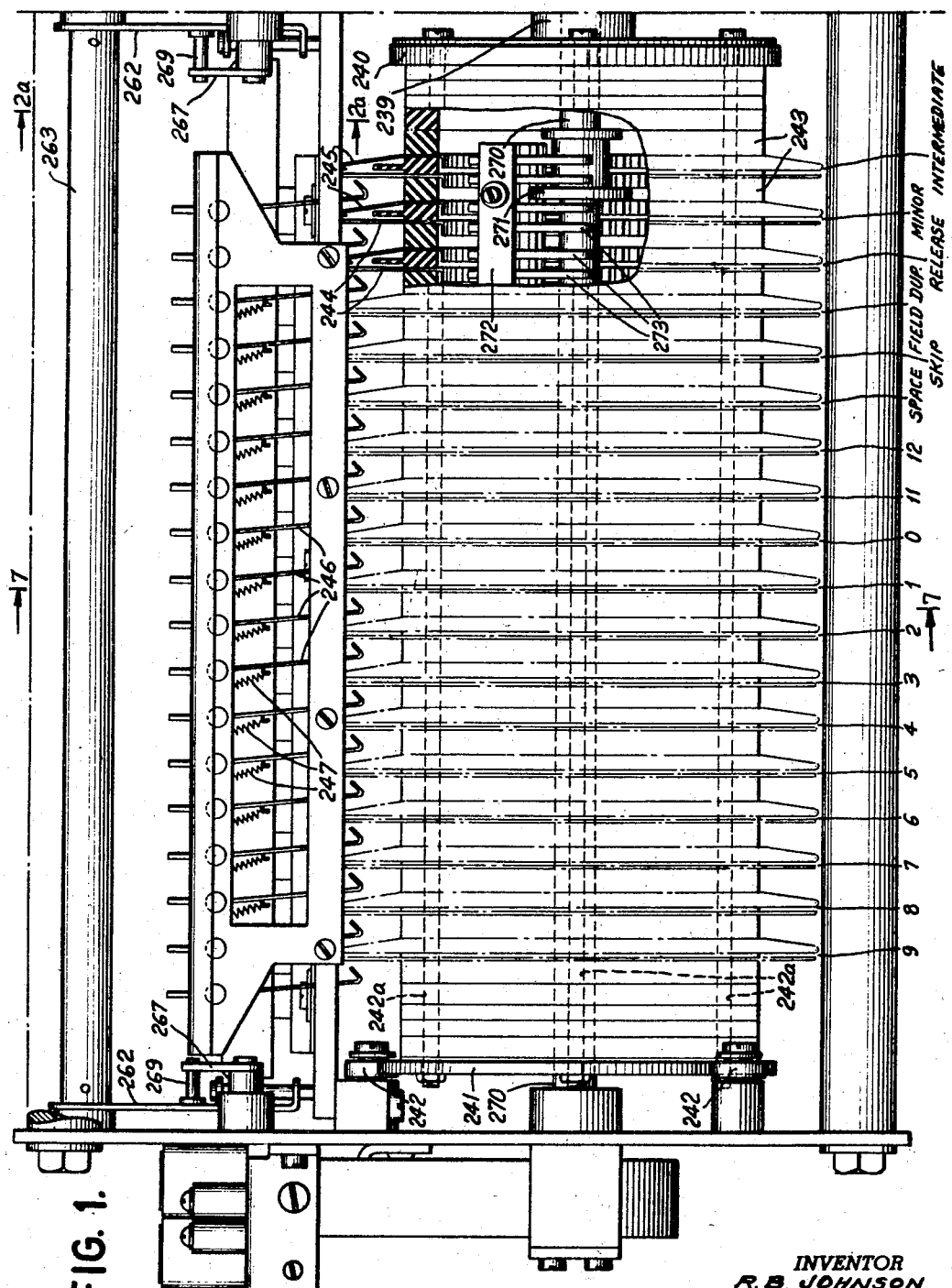
Figure 1A:
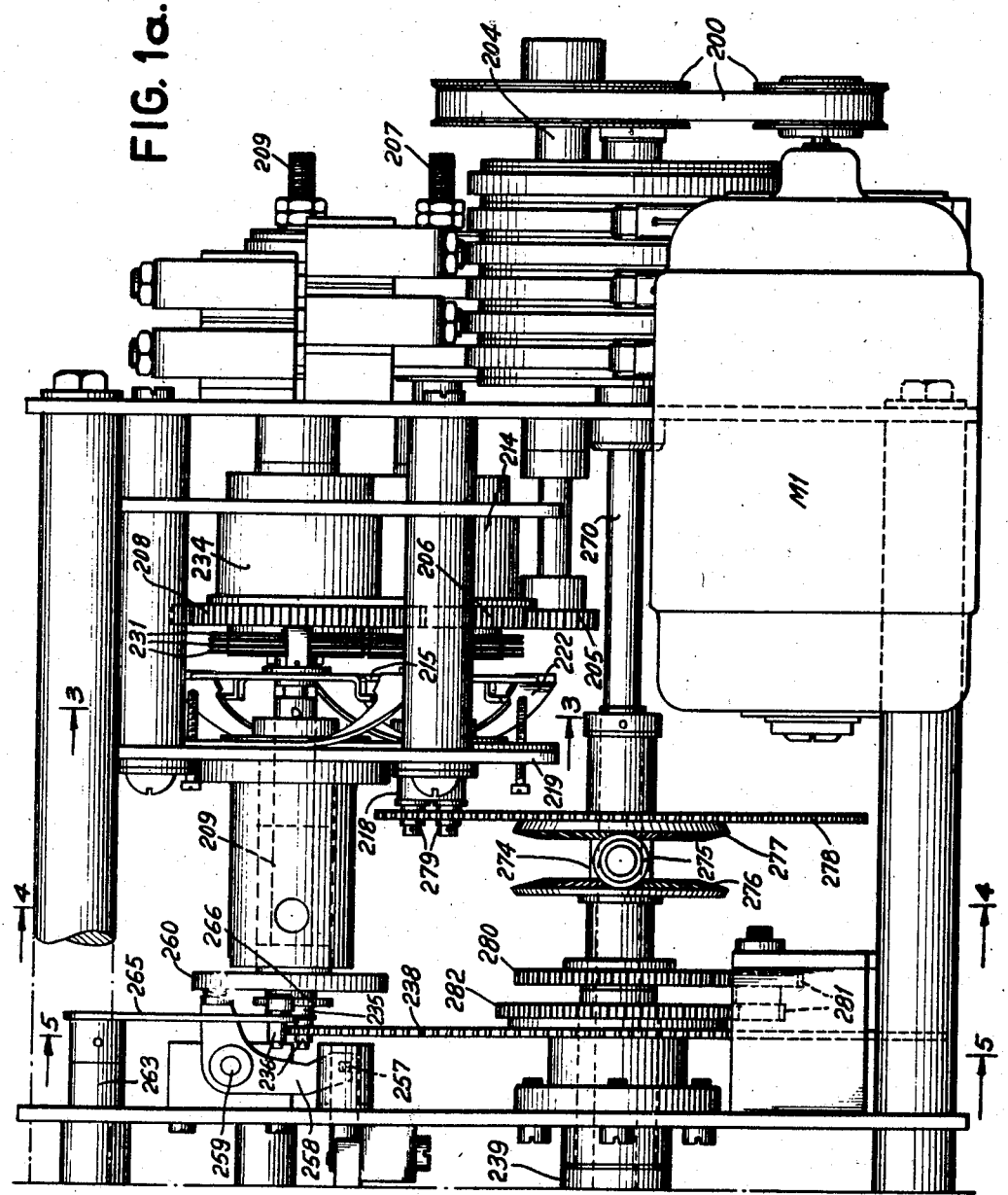
Figure 6:
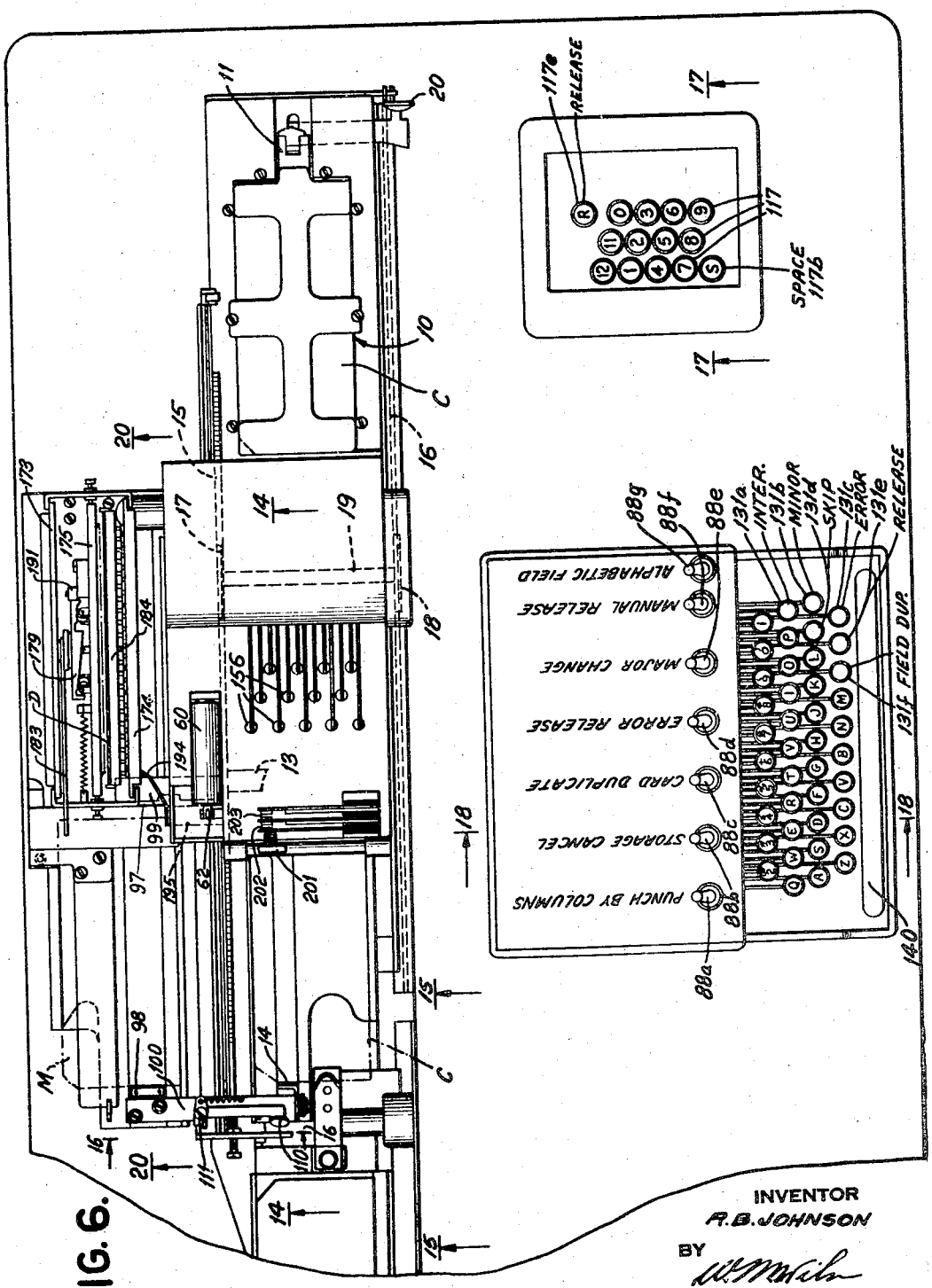
Fig. 6 is a plan of the punching apparatus and keyboards.

The apparatus comprises four mechanically separate units, a card feeding and sensing unit shown in the upper part of Fig. 6, an alphabetic keyboard arrangement shown in the central part of the figure, a numerical keyboard shown at the right of Fig. 6, and a storage unit located beneath the base of the machine, and shown in Figs. 1 and 1a.

The mechanical arrangement of the card feeding mechanism is substantially the same as that found in the machine known as the "International Duplicating Key Punch," such as shown in Patent 1,914,263, granted June 13, 1933, to C. D. Lake et al., Patent 2,107,161, granted Feb. 1, 1938, to R. E. Page, and Patent 1,976,618, granted Oct. 9, 1934, to F. Lee et al. Patent 2,107,161 also shows a numerical keyboard structure similar to that used in the present arrangement. Since most of the mechanical arrangement of the card punching mechanism is already well known, the same will be but briefly explained in the following and in only so much detail as is necessary for an understanding of the present invention, and reference may be had to the patents cited for a further detailed explanation.

*Card feeding mechanism*

Referring to Fig. 6, record cards C to be punched are placed in a magazine designated 10 from which they are advanced singly by means of a picker 11 toward the left to present their first column to a row of card punches designated 5 in Fig. 14. In this position the card carriage comprising a pusher 13 and a forward guide 14 engages the card and advances it step by step under control of the escapement mechanism to be described later. Pusher 13 and guide 14 are carried by an escapement rack 15 (see Fig. 6) and the picker knife 11 is carried by a rack bar 16. Rack 15 has a gear 17 meshing with its lower edge (see Fig. 14) and bar 16 has a gear 18 meshing with its upper edge, both gears being mounted on a cross shaft 19 (see Fig. 6). Due to this connection between the elements, the movement of picker 11 toward the left as viewed in Fig. 6 is accompanied by movement to the right of pusher 13 and forward guide 14. At the commencement of operations, the picker and pusher are in the position shown in Fig. 6.

The rack 16 is provided with a finger piece 20 at its right hand extremity by means of which the rack 16 and the picker 11 may be moved toward the left to feed a card from the magazine 10. This movement is accompanied by movement of the pusher 13 in the opposite direction, the parts being so proportioned that, when the card has been advanced to present its first column to the row of punches 5, the pusher 13 will have moved toward the right sufficiently to engage the right hand or trailing edge of the card and will now control the further advancement thereof in response to the operation of the escapement mechanism. The usual one-way clutch mechanism (shown in Fig. 2 of Patent 1,976,618) permits the immediate return to the right of bar 16 and picker 11 under control of the usual spring.

The operation of card feeding just outlined is more fully explained in Patent 1,772,186 granted to F. L. Lee et al. for a duplicating punching machine. The escapement mechanism referred to is of the same general nature as that disclosed in the Schaaff Patent 1,426,223 and a brief description thereof will be given later.

Secured to the under side of the base of the machine is a motor 22 (Fig. 14) coupled to a stub shaft 23 to which is secured a worm 24 in mesh with a worm wheel 225 secured to a shaft 226, one end of which has secured thereto a ratchet-shaped clutch element 25. Loosely mounted on shaft 226 is a gear 26 meshing with teeth on the lower edge of rack bar 16 and on which gear is mounted a disc 27. Mounted upon disc 27 is a clutch mechanism generally designated 28, one element of which is provided with a pin 29 positioned for engagement by a finger 30 integral with the armature 31 of a magnet 32. With the machine at rest, the parts occupy the position shown in Fig. 14 and, when magnet 32 is energized, the finger 30 will operate the clutching mechanism to couple the disc 27 to the rotating ratchet 25, so that the disc 27 and gear 26 are rotated counterclockwise to drive the rack bar 16 toward the left. The clutching mechanism is constructed, as explained in greater detail in the patents referred to, so as to remain in engagement for substantially a complete revolution, at the completion of which time the clutching mechanism is uncoupled whereby the parts may automatically return to the position shown, under the influence of a spring (not shown).

This power drive of rack bar 16 toward the left has the same effect as the manual movement thereof previously explained, that is, a card will be advanced to punching position and the pusher 13 will engage the same for further step-by-step advancement, and rack bar 16 may thereafter return to its home position without disturbing the advanced position of the card C or pusher 13, this being permitted by the one-way clutch structure mentioned above.

Also integral with the armature 31 of the trip magnet 32 is an arm 34 (see Fig. 14), the free end of which is adapted to bear upon the center blade of pairs of contacts 35 and 36 to open the former and close the latter when magnet 32 is energized, and they will be maintained in such shifted position by a latching bell crank 37, the lateral extension 38 of which is adapted to be engaged by a plate 39 secured to gear 26, at the termination of the driving movement of the latter. The contacts 35 and 36 are used to control the energization of the driving motor 22 and their function will be more fully explained in connection with the circuit diagram. For the purposes of the present invention a third pair of contacts 36a are provided adjacent to contacts 35, 36 and arranged to close with contacts 36.

The punches 5 are operated under control of the storage unit and also by means of a duplicator in accordance with the perforations of a pattern member which may be a previously punched card functioning as a master card M (Fig. 6). The punches 5 (Fig. 14) are of the general form disclosed in the patent of Lee and Phillips 1,772,186 and are normally held in raised position by springs 6 interposed between the enlarged heads thereof and the stripper member which is provided with openings to receive the lower ends of said springs. Resting on the upper ends of said punches are interposers 7 supported at their rear ends on a cross member 8. The interposers 7 are so notched at their forward ends that, when they are in normal position, clockwise rocking of an actuating plate 151 will move a portion of the depressor plate 151 into such notches.

However, when any magnet 154 is energized, it will rock a related arm 155 to depress a plunger 156 and actuate a bell crank 157 against the action of suitably connected springs. The forward arm of each bell crank has a rounded head fitting into a notch in the shank of the plunger, the upright end having a pin in a slot in the lower edge of the corresponding interposer 7. Such interposer will then be advanced to a position where depression of the member 151 will effect depression of the interposer and consequently of the corresponding punch.

Upon movement of any of the interposers 7 a pair of contacts 158 is adapted to be closed thereby, closing the circuit to a punch magnet 159 which through intermediate mechanism is adapted to rock the plate 151 to actuate the selected punch 5.

Upon energization of the punch magnet 159 in this manner the armature 160 will be swung about its pivot and through the link 161 will rock a bell crank 162 about a pivot to draw the link 163 downward and rock the plate or depressor 151.

Subsequently, the circuit of the magnet 159 will be broken allowing the return of the depressed interposer to normal position. At this time the escapement mechanism will be effective and the rack and card carriage will advance one tooth to permit punching in the next column of the card.

Across the lower edge of all of the interposers 7 is a bail or universal member 164 pivoted at 168 and reaching into notches in the interposers. Attached to the bail member 164 is a depending arm 169 held against a finger on link 161 by a spring 170. This spring also tends to pull the arm 169 downwardly rocking the bail 164 clockwise into engagement with the right hand shoulder of the slots in the interposers 7. The arm 169 has a shoulder normally hooked under the lower contact leaf of the pair of contacts 158. When an interposer 7 is advanced to operative position, this interposer rocks the bail 164 counterclockwise raising the arm 169 and causing contacts 158 to be closed. This causes energization of magnet 159 to operate the perforating device. As the punch passes through the card and the link 161 moves to the right, the finger extending upwardly therefrom will push the lower end of arm 169 to the right so that the contact leaf will be released and contacts 158 will then open, de-energizing the magnet 159 and permitting the punch and its actuating mechanism to return to normal positions.

The interposer 7 returns when the actuating magnet 154 is released and permits bail 164 to turn clockwise to normal position and arm 169 to be lowered so that its shoulder will again snap under the lower blade of contacts 158 and be ready to close the contacts when the next interposer is advanced. It will be recognized that, when the contact leaf is released, contacts 158 cannot be closed again until the magnet which effected their closing has been deenergized and the next energization effected.

One of the interposers 7 does not have its left hand end in line with plate 151, notched and is also not actuated by any magnet. This is the well known spacing interposer operable whenever the card is to be "spaced" without accompanying punching thereof. As will be explained from the circuit diagram hereinafter, the magnet 159 may be energized independently of closure of contacts 158 so that through this "spacing" interposer the escapement alone will be operated to space the card.

In Fig. 14 the depressor plate 151 has a finger 201 integral therewith which rocks to close pairs of contacts 202 and 203 whenever the plate is actuated. The functions of these contacts will be explained in connection with the explanation of the circuit diagram.

*Escapement mechanism*

When the card C is in position above the punches 5 (Fig. 14), further advance is controlled by the escapement mechanism which in turn is responsive to the depression of the interposers 7. Each interposer rests upon a bail 40 operatively connected to rock a shaft 43 counterclockwise in Fig. 14 and clockwise in Fig. 13. The rod 43 is rocked as an incident to each spacing or punching operation and has secured to one end thereof oppositely extending arms 45, 46 (see Fig. 13), of which arm 46 is provided with a laterally extending pin for engagement with an enlarged opening in a stepping dog 47 which is loosely pivoted on rod 43. Opposite arm 45 is provided with a pin extending into a slot formed in the locking dog 48. When rod 43 is rocked, arm 46 will, through its pin and slot connection with dog 47, lift the latter out of one of the notches of the rack 15 and at the same time arm 45 will depress locking dog 48 into a notch between the rack teeth. At this time a spring 49 advances the loosely pivoted dog 47 a short distance, just sufficient to permit this dog to move above the top of the next tooth. When the locking dog is again raised, stepping dog 47, due to the movement of rack 15, will ride down along the next tooth until it strikes the end thereof and the carriage is thereby arrested. The usual spring drum (not shown) is provided to bias the rack 15 toward the right as viewed in Fig. 13. The detailed structure of this dog and rack arrangement is well known and need not be further described, and it is sufficient to note that for each operation of an interposer 7, the rack 15 is advanced one step or tooth, carrying with it the pusher 13 and forward guide 14, so that the card is likewise advanced one step, each step of advancement being coextensive with the columnar spacing of the columns of the card.

The machine is provided with a release solenoid designated 60 (Figs. 6 and 19) which, when energized, will rock a lever 61 about pivot 62 and urge a link 63 to the right to rock a lever 65. The mechanism controlled by this lever is well known in this type of machine and is briefly as follows. The lever 65 will draw a member 66 toward the right as viewed in Fig. 19. This member 66 is suitably mounted for such movement and at its left hand end is provided with a cam surface 67 which cooperates with the left edge of the supporting plate 68. The member 66 also extends beneath an element known as the skip lifter 51 in a position generally as indicated in Fig. 19, so that as the member 66 is moved toward the right, cam 67 cooperating with plate 68 will cause an upward tilting of the left end of the member which in turn will lift the element 51 upwardly against the stepping dog 47, whereupon the rack will be freed to advance uninterruptedly toward the left. Frictional engagement of the parts will maintain the member 66 in its shifted position so that the escapement of the rack, when initiated by the magnet 60, will not be interrupted until the card has been fully advanced, that is, until the last card column is advanced past the punching position.

At this time a suitable projection carried by the rack will engage a depending extension of the left extremity of member 66 and will draw the member toward the left back to the position it occupies in Fig. 19. Briefly summarizing, after the card has been initially advanced to present the first card column to the punches 5, its further advance is controlled for column-by-column movement through the punch magnet 159 and the complete release of the card from any position to its last column position is controlled by the release solenoid 60.

*Automatic card ejector*

The machine is provided with mechanism for automatically removing completely punched cards and depositing the same in a receptacle provided for the purpose. This mechanism is more fully shown and described in Patent 1,916,965 issued July 4, 1933, to J. M. Cunningham. Briefly, a gripper 70 occupies the position shown in Fig. 15 with its jaws open in card receiving position during the period that the card is advanced by the escapement mechanism. The gripper is carried by the rod 71 to which is secured a gear 72 which through idlers 73 is connected to a slidable rack 74 which is normally biased toward the right by a spring 75. A pivoted latching member 76 engages a latching shoulder at the left hand extremity of the gripper and thereby serves to hold the parts in the position shown in Fig. 15. When the latching member 76 is rocked counterclockwise about its pivot 77, the spring 75 will be free to drive the rack 74 toward the right and, through the gearing 73, 72 flip the gripper 70 in a counterclockwise direction. This flipping action is effected after the card has been advanced to its extreme left hand position, at which time the leading edge thereof is between the jaws of the gripper. Releasing the gripper will cause the jaws to automatically clamp the end of the card thereto so that the card will be swung in an arc about the rod 71 and deposited in the receptacle 78, suitable means being provided to cause the jaws to release the card.

For the purpose of actuating the latch member 76 there is provided the usual eject magnet 79 which, when energized, will rock its armature 80 about pivot 81 and draw a link 82 toward the right. The left extremity of the link is provided with an extension 83 which, when the link is moved, will strike a depending arm of the latch member 76 and effect the rocking action thereof which results in the ejection of the card by the gripper. This ejecting operation will bring about the automatic feeding of another card from the magazine 10 to the row of punches. This operation is initiated by means of a pair of automatic start contacts designated 84 which are closed through a pivoted bell crank 85, a depending arm of which is engaged by an extension 86 in rack 74 when the rack has been released for movement toward the right.

In a manner to be explained in connection with the circuit diagram, the contacts 84 control the operation of the driving motor 22 (Fig. 14) which, as explained, will cause advance of a new card from the magazine 10 and also cause movement toward the right of card pusher 13 and forward guide 14. As the rack 16 is moved toward the left (Fig. 15), its left hand end will engage an adjustable extension 87 carried by the rack 74 which will positively restore the rack toward the left and through the gearing shown will return the gripper to the position it occupies in Fig. 15, the latch member 76 being spring-biased to engage and hold the gripper in such position until the newly advanced card has been advanced to its last column position, whereupon the ejection and initiation of a new card feeding operation will take place.

*Master card sensing mechanism*

Referring to Figs. 6 and 20, a master card designated M may be placed in the machine in parallel alignment with the advanced card C. This card M is held in position between a pusher 97 and a forward guide 98 which are carried by cross arms 99 and 100, respectively, which arms are extended from the escapement rack 15. The card M is manually placed in position and travels back and forth with the card carriage. The operation is such that the card is advanced step by step past a set of brushes 101 for each of the successively fed cards C, and as each of the columns of the cards C pass the row of punches 5, the corresponding columns of the card M concurrently pass the sensing brushes 101. There are provided the usual twelve brushes 101 for sensing the index point positions of the card columns. The brushes 101 are mounted on an insulating block 102 and are moved vertically into contact with the card through linkage generally designated 103 which is controlled by the master brush magnet 104. The cooperating contact roller 105 is supported in the gate 106 which is pivoted at 107 and which, when the master card M has been placed in position, is rocked downwardly into closed position, where it is held by a spring-pressed latch 108. The free end of the gate is provided with a plunger which effects closure of so-called door contacts 109. Pairs of contacts 57 and 58 (Fig. 20) are provided and so positioned that, when magnet 104 is energized, its armature causes contacts 57 to open and contacts 58 to close.

Referring to Figs. 6 and 16, there is mounted on the cross arm 99 a finger piece 110 pivoted at 111, which finger piece also has a depending arm 112. When it is desired to manually back-space the cards, it is done by pressing against the finger piece 110, whereupon a slight rocking thereof is effected before the card carriage actually moves. During this slight rocking, the extension 112 will rock a universal bar 113 about its pivot 114 to cause a depending arm 115 thereon to open the so-called cut-out contacts 116. These contacts are in the master reading brush magnet circuits and are provided to insure that this magnet is deenergized and its related brushes in down position before there is any backward movement of the cards which might injure the inclined brushes 101.

Alphabetic keyboard

Figure 18:
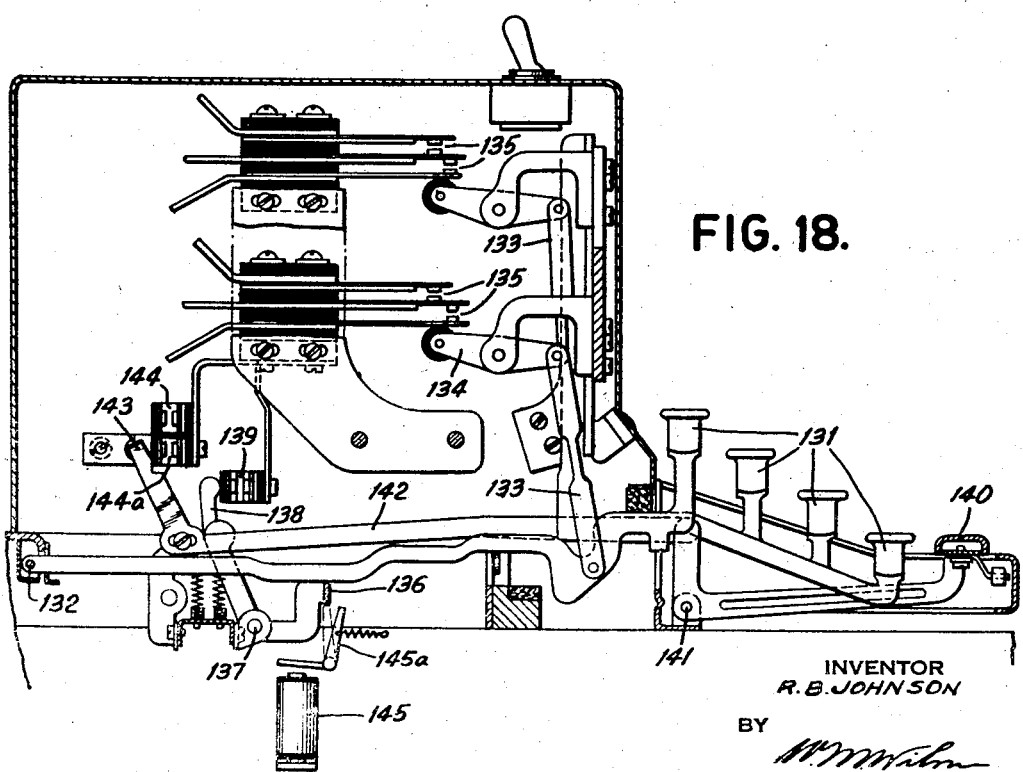
Fig. 18 is a sectional elevation taken on lines 18—18 of Fig. 6.

In Figs. 6 and 18 is shown the arrangement of the alphabetic keys. This section is an independent unit located as shown in Fig. 6 for convenient manipulation by the operator. The keys are marked with numerals and letters in accordance with standard keyboard arrangement and each of the keys is arranged to close one or a pair of contacts in accordance with the coding assigned to the respective keys. These keys are designated 131 and are pivoted at 132 and the key, when depressed, will rock a lever 134 through a link 133 to cause closure of pairs of contacts 135. Underlying all the keys 131 is a ball 136 pivoted at 137 and provided with an upwardly extending arm 138 which causes closure of a pair of contacts 139, so that operation of any key 131, in addition to closing its contacts 135, also closes contacts 139, the parts being so adjusted that the contacts 135 are closed before contacts 139 close and open after contacts 139 again break.

The keyboard is also provided with six additional keys designated as 131a, 131b, 131c, 131d, 131e and 131f identified in Fig. 6 as Intermediate, Minor, Error, Skip, Release and Field duplicate, respectively. These keys, when operated, close contacts similar to contacts 135 designated on the circuit diagram as 135a to 135f to correspond to keys 131a to 131f. The last three of these keys, namely, Skip, Release and Field duplicate, close contacts 139 as well as their contacts 135, while the first three close only their contacts 135.

The space bar 140 is secured to an arm pivoted at 141 which, through link connection 142 provided with extension 143, is arranged to close two pairs of contacts 144 and 144a. Beneath ball 136 is a keyboard locking magnet 145 and an armature 145a arranged so that, when magnet 145 is energized, its armature is rocked into the path of ball 136 to prevent the rocking of the latter and consequently the keys 131 are also locked against operation.

Numerical keyboard

Figure 17:
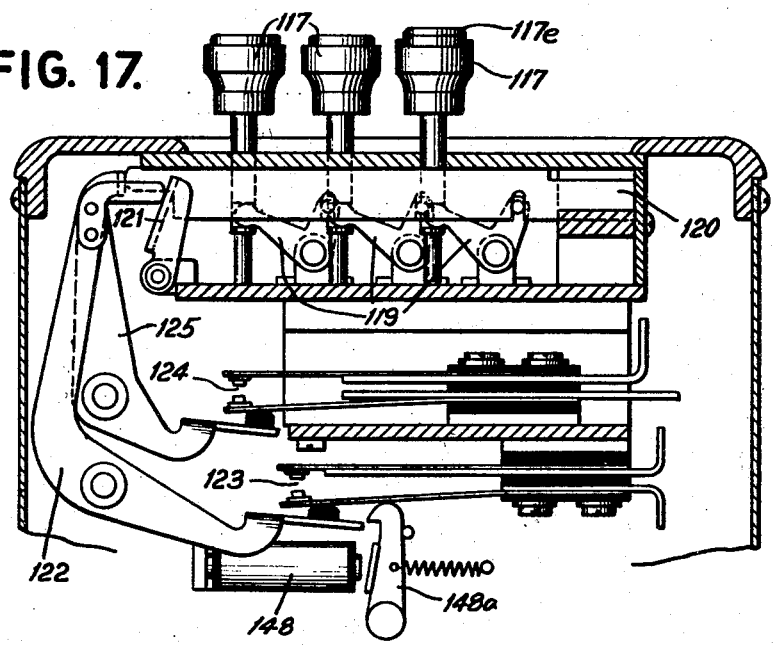
Fig. 17 is a sectional elevation taken on lines 17—17 of Fig. 6.

In Figs. 6 and 17 is illustrated the numerical keyboard in which a key 117 is provided for each of the twelve index point positions of the card in addition to a release key 117e, and a space key 117b. Depression of any key 117, 117e or 117b will rock a bell crank 119 which through a pin and slot connection will move a slider 120 toward the left as viewed in Fig. 17. Each of the sliders cooperates at its left end with a bail 121 to rock the same counterclockwise and the bail in turn will rock a lever 122 to close a pair of contacts 123. Contacts 123 are common to all of the keys 117, 117e and 117b and are closed upon depression of any one of said keys.

There is one slider 120 for each of the keys 117, 117e and 117b, which slider is urged to the left upon depression of its associated key and for each slider there is also a lever 125 which is rocked to close an associated pair of contacts 124. These keys and their contacts are mechanically independent of the remainder of the mechanism and may be located in relation to the remainder of the apparatus as shown in Fig. 6 for convenient right hand operation. A locking magnet 148 (Fig. 17) is provided which, when energized, will rock its armature 148a to engage the common lever 122 and prevent its rocking and thereby prevent operation of any of the keys.

Miscellaneous contacts

Several contacts in addition to those described are provided in the machine, and the operation of these will be pointed out before the entire operation of the apparatus is explained in connection with the circuit diagram.

Figure 13:
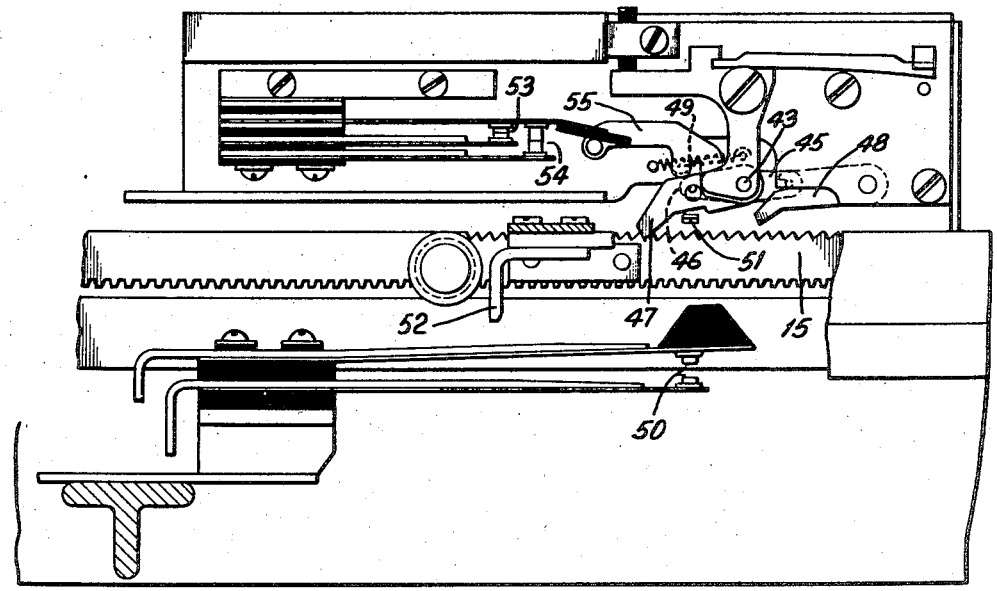
Fig. 13 is a detail of the card carriage escapement mechanism.

In Fig. 13 is shown a pair of contacts 50 known as the "last column" contacts. These contacts are closed by an arm 52 secured to the escapement rack 15 and so located that, when the escapement rack is advanced one step past the position in which the last column of the card is presented to the punches, the extension 52 will be in engagement with and close contacts 50. In the same figure are shown contacts 53, 54 whose common upper blade is shifted by an arm 55 which is loosely pivoted on the rod 43 and which has a lateral extension resting upon the upper edge of the stepping dog 47 so that, during escapement from one column to another, the incidental raising of the stepping dog 47 will cause opening of contacts 53, 54 through arm 150 during the period that the dog is raised.

A shown in Fig. 6, there are provided seven switches labeled Punch by columns, Storage cancel, Card duplicate, Error release, Major change, Manual release and Alphabetic field. These switches are generally designated 88a to 88g and appropriately labeled in the circuit diagram where their several functions will be explained in connection with the description of the circuit connections therethrough. Switches 88a, 88f and 88g are of the type that remain set in either of two positions while the remainder are spring biased in an "off" position and remain shifted only as long as the operator manually retains them in their "on" position.

In Fig. 14 is shown the usual magazine card lever contacts 90 which are closed by cards in magazine 10 and which open when the supply of cards is exhausted. Beneath the magnets 154 is a second pair of card lever contacts 91 closed by a card lever 92 as the card C passes from magazine 10 to the punching position.

Control card sensing unit

Figure 21:
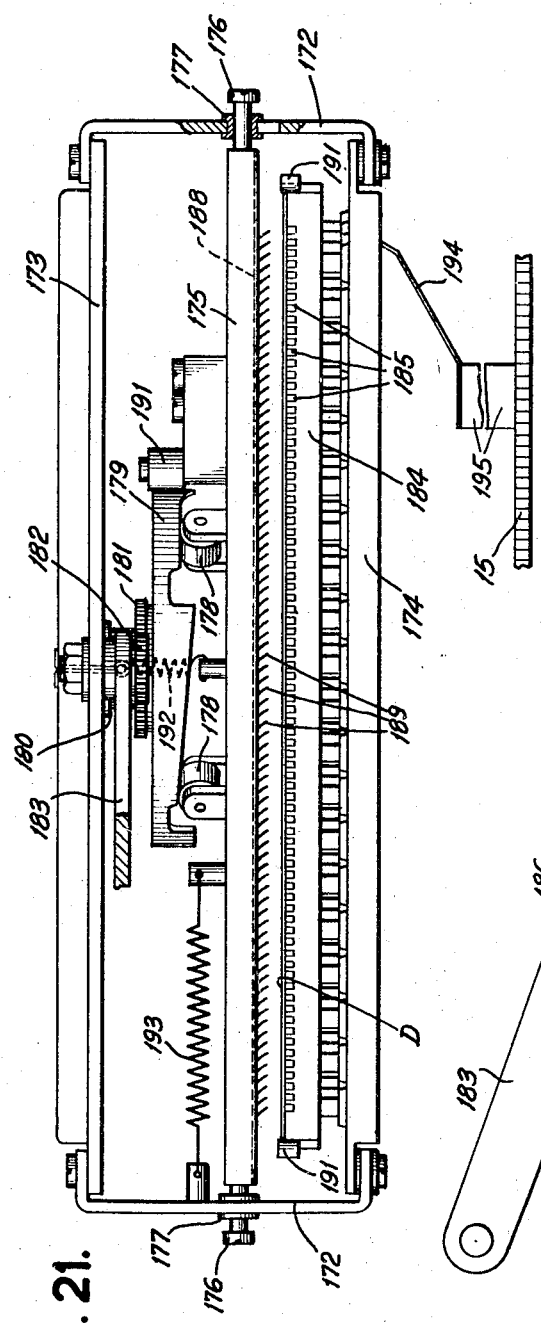
Fig. 21 is a plan of the control card receiving and sensing mechanism.

In Figs. 6 and 21 is shown a device for receiving and sensing a control card D. This unit is mounted above the master card table and comprises a pair of side plates 172, back plate 173 and front plate 174. Within the rectangle formed by these plates is a sensing or feeler plate 175 of insulating material from whose ends studs 176 project through rollers 177. The rollers are slidable in suitable slots in side plates 172 toward and away from plate 174. With such mounting, plate 175 is similarly slidable and may also move transversely. Affixed to plate 175 are four rollers 178 spaced in a circle to engage a face cam 179 rotatable on a sleeve 180. Secured to cam 179 is a gear 181 meshing with a gear 182 to which a lever 183 is secured. When lever 183 is rocked clockwise (Fig. 22), cam 179 will be turned in the opposite direction and its inclined surfaces will force plate 175 toward plate 174.

Intermediate plates 175 and 174 is a fixed panel 184 of insulating material in which there are embedded two sets of rows of conducting strips 185, each of which strips has an electrical connection 186 (Fig. 24) extending through plate 174 arranged in staggered relationship because of the close spacing of the strips. Each connection 186 is surrounded by an insulating bushing 187 and the plate 174 itself is electrically insulated from side plates 172.

The record card D is of the same size as master card M and card C and is provided with the same eighty columns of perforation receiving positions (Fig. 27) so that, when a card D is inserted between plates 175 and 184, prior to operation of cam 179, each card column will be in line with a pair of conducting strips 185. Carried by plate 175 and extending transversely to strips 185 is a series of contact strips 188 for each of the X, 0, 1, 2, 3, 4, 7 and 8 positions of the card. Each strip 188 is a thin metallic strip or tape so stamped (Figs. 25, 26) that there are eighty spring leaf projections 189 extending therefrom in registration with the card columns and vertical strips 185. To mount the strip 188 in plate 175, the latter is provided with undercut slots 190 as shown in Fig. 25, into which the strips are slid and then secured as by riveting.

Guide blades 191 (Figs. 21, 24) locate card D longitudinally upon insertion thereof and it will be apparent that when the plate 175 is urged toward plate 184, the projections 189 will pass through any perforations in the card and effect an electrical connection between a strip 188 corresponding to the horizontal row containing the perforation and the strip 185 corresponding to the vertical column of the card.

After projections 189 have contacted card D and passed through the perforations therein and just before cam 179 has come to rest, a rise 179a (Fig. 22) on its periphery engages a roller 191 pivoted on plate 175 so that the plate is given a slight lateral shift and causes projections 189 to rub against the strips 185 insuring good electrical contact therewith. When card D is to be removed, cam 179 is returned to its initial position, whereupon spring 192 will retract plate 175 and spring 193 will shift it laterally.

Slidable across the face of plate 174 (Fig. 21) is a multifingered wiper 194 carried by and insulated from a bracket 195 secured to carriage rack 15, so that as the carriage advances the wiper 194 moves therewith across the ends of connectors 186. When the carriage rack 15 is in position to present column 1 of card C to the row of punches, wiper 194 engages the two selectors 186 of column 2 of card D; that is, there is a one column offset so that, as a column of card C is being punched, the next higher numbered column of card D is being sensed. It will be noted that column 1 of card D is not sensed by wiper 194 and, as will be explained in connection with the circuit diagram, the perforations in this column will complete circuits through related strip 185 during card feeding operations independently of the position of wiper 194.

Figure 22:
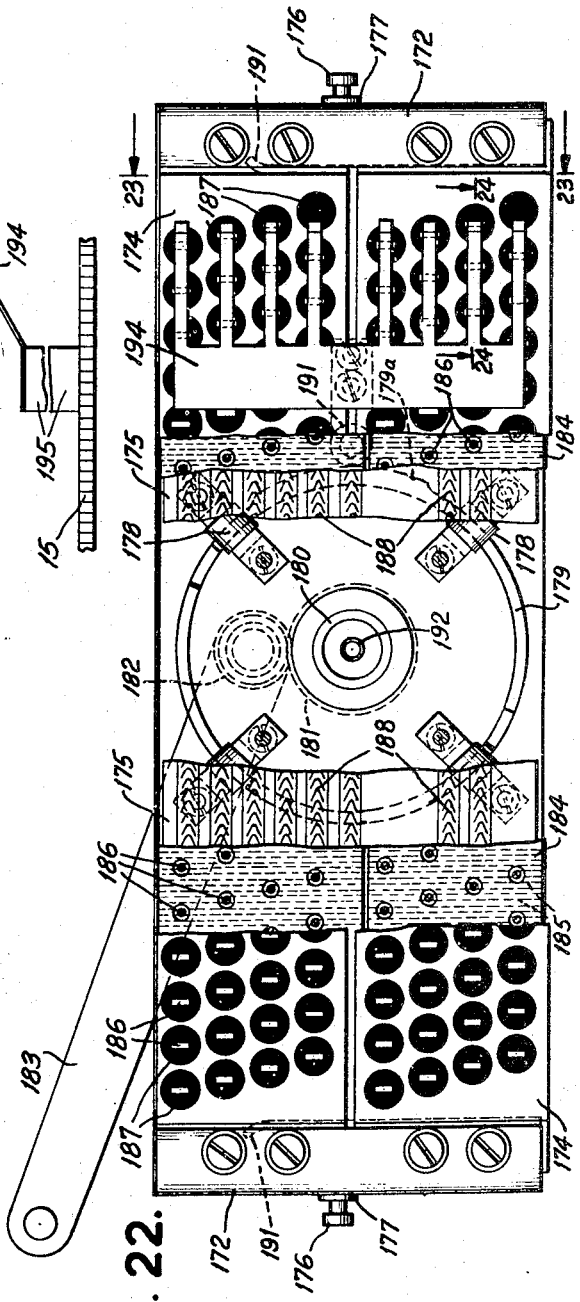
Fig. 22 is an elevation of Fig. 21 with parts broken away.

As seen in Figs. 22 and 23, the strips 185 in each column are split into two separate strips to permit two parallel circuits to be completed, one through one of the six upper positions X, 0, 1, 2, 3 or 4, and another one of the two lower positions 7 or 8, as will be explained.

It will be noted in Fig. 22 that, when one of the fingers of wiper 194 is in contact with a connector 186, another finger engages the plate 174, so that a circuit connection is completed from the plate (wired in a circuit as will be explained) to wiper 194, thence to connector 186, and related strip 185, thence through the hole in card D to the corresponding strip 188 which is wired to said circuit. In this manner each perforation will establish a circuit connection through the appropriate strip 188 when the wiper 194 is at the corresponding columnar position.

The control functions of card D

The nine perforating positions of card D serve to control machine operations which will be briefly set forth now and explained in greater detail in connection with the circuit diagram.

An X perforation called the "Alphabetic field" perforation will cause the machine to delay punching from information in the storage unit until such time as data has been stored in either twenty or thirty positions of the unit depending on the setting of switch 88g. The purpose of this delay is to allow the operator to correct any error that may occur in setting up such data. Operators are often conscious of having made an error in keying, immediately after making it and by delaying punching the stored information may be cancelled from the unit and then correctly rekeyed.

A zero perforation called the "Numerical field" perforation will act the same as the X perforation but will delay punching for only ten columns.

A 1 perforation called the "Minor control" perforation will cause punching in the card C under control of a "minor" field in the master card M.

A 2 perforation called the "Intermediate control" perforation will cause punching on the card C under control of an "intermediate" field in the master card M.

A 3 perforation called the "Major control" perforation will cause punching in the card C under control of a "major" field in the master card M.

A 4 perforation causes the next following field in card M to control punching. If such following field is blank, the 4 perforation serves to cause automatic spacing across such field without punching in the corresponding field of card C.

A 7 perforation causes interruption of automatic spacing when the card column corresponding thereto arrives at the punching position.

An 8 perforation is called the "Release" perforation and will automatically release the carriage from the column in which such hole is punched.

Storage mechanism

This mechanism is a separate mechanical unit whose only connection with the punching mechanism is through electrical connections to be traced in connection with the explanation of the wiring diagram.

Constantly running motor M1 (Figs. 1a, 2) through belt and pulley connection 200 drives a shaft 204 whose other end has secured thereto a pinion 205 meshing with a gear 206 freely rotatable on a shaft 207. Gear 206 in turn meshes with a gear 208 freely rotatable on a shaft 209.

Shafts 207 and 209 which are called the "Read in" and "Read out" shafts, respectively, may be selectively coupled to their respective gears 206 and 208, through half revolution clutch mechanisms. These clutches are alike for both shafts so that a detailed explanation of one will suffice for both.

Figure 3:
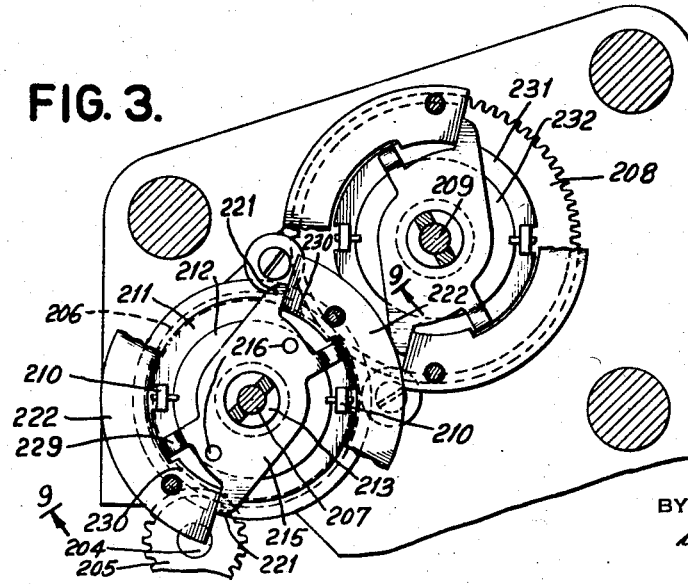

Referring to Figs. 3 and 9, gear 206, through a pair of laterally extending fingers 210 drives a plurality of clutch plates 211 suitably notched for mounting on the fingers and free to move axially. Interspersed between plates 211 are further clutch plates 212 slidably keyed on a solenoid plunger 213. This plunger 213 is slidable on shaft 207 and extends partially within the winding of a solenoid 214. Upon energization of the solenoid, plunger 213 is drawn to the right as viewed in Fig. 9, along shaft 207 and will draw with it a disk 215 affixed to the end thereof. Pins 216 in the disk will press against the outer clutch plate 212 to slide the several plates 212 and 211 together, so that rotation of gear 206 will be imparted to plunger 213 and its disk 215.

Plunger 213 has a slidable key connection generally designated 217, with a short rod 218 suitably supported for rotation in a frame plate 219. By means of this connection the plunger 213 may slide axially while retaining its rotative connection with rod 218. The rod 218 is joined to shaft 207 by a pin 220 through which the shaft is rotated. Thus, upon energization of solenoid 214 shaft 207 and rod 218 are turned and after a half revolution the parts will be uncoupled in the following manner. Disk 215 has a pair of fingers 221 (Fig. 2) which abut against the edges of a pair of stationary spiral cam plates 222 to prevent clockwise rotation of the disk. When the clutch is engaged, fingers 221 are drawn out of alignment with the edges of the cam plates, so that the disk 215 is free to rotate. Near the end of 180° of rotation, a second pair of offset fingers 229 will engage the inclines 230 of plates 222 and be thereby forced to the left as viewed in Fig. 9 to slide disk 215 back to its initial position, so that fingers 221 will strike against the edges of plates 222 and be stopped thereby.

Figure 13A:
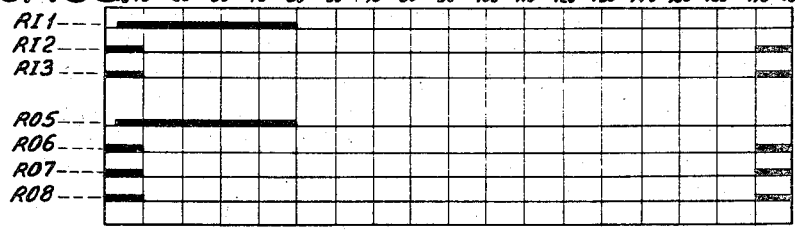
Fig. 13a is a diagram of the timing of certain cyclically operated contacts.

Thus, upon energization of solenoid 214 shaft 207 is given a half revolution. On the end of this shaft (Fig. 2) are secured several cams designated 230 which operate contacts generally designated RO to identify them as operating during rotation of the readout shaft 207. The timing of these contacts is shown in Fig. 13a and their functions will be explained in connection with the circuit diagram.

Figure 2:
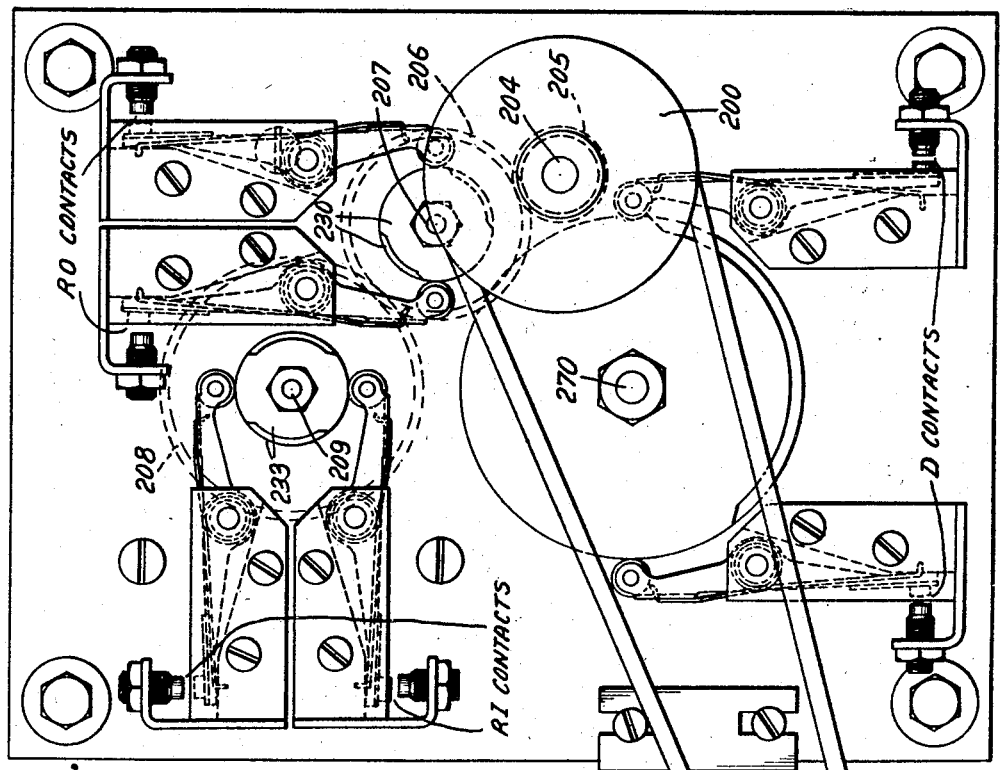
Figure 2A:
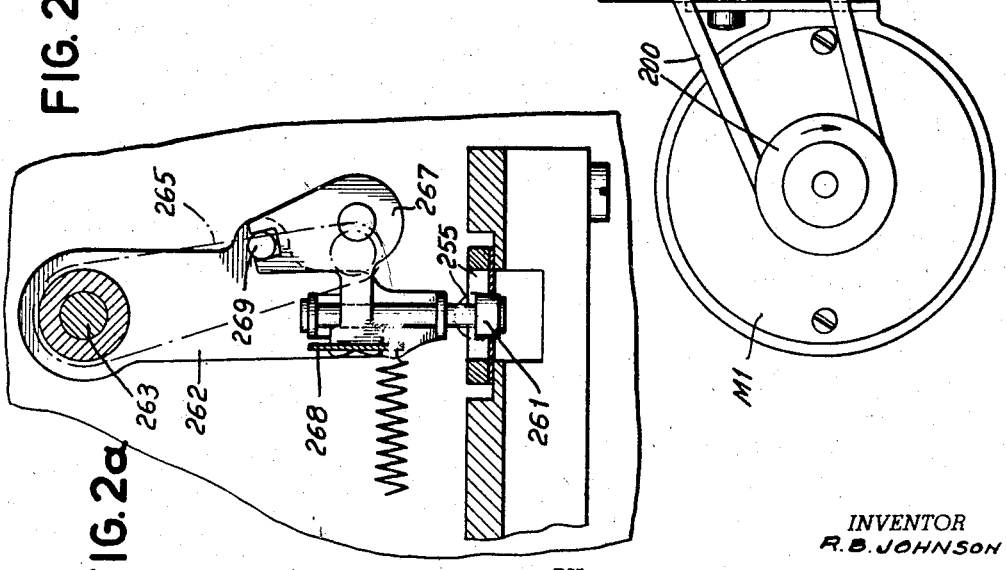
Fig. 2a is an enlarged detail of parts shown in Fig. 1, the view being taken along lines 2a—2a of Fig. 1.

In Fig. 3 the gear 208 through a similar clutch device comprising driving clutch plates 231 to which in Fig. 2 are affixed cams designated 233 which operate contacts generally designated RI to identify them as operating during the rotation of the "Read in" shaft 209. In Fig. 1a the readin solenoid 234 is indicated where it is seen that shaft 209 extending therethrough turns a collar 235 in which there is mounted a pair of rollers 236. These rollers engage in teeth 237 of a wheel 238 (Fig. 5) so that, when shaft 209 is given a half turn, pins 236 will advance wheel 238 one tooth or step in a clockwise direction as viewed in Fig. 5. Wheel 238 has eighty-four teeth so that it may take that many stepping positions.

Figure 7:
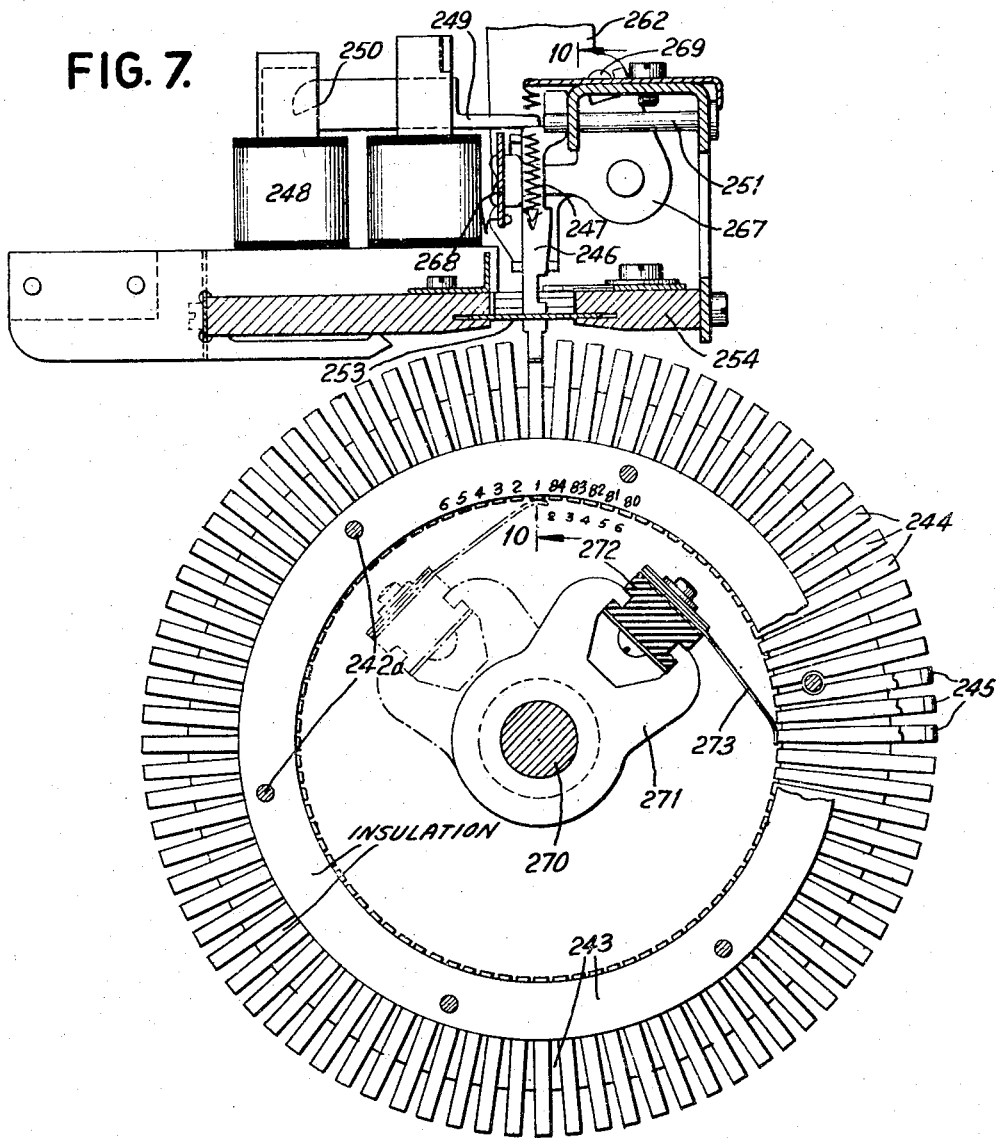
Fig. 7 is a section taken on lines 7—7 of Fig. 1.

This wheel is secured to a sleeve 239 (Figs. 1a and 1) which in turn is secured to a storage drum comprising end flanges 240 and 241, the latter of which is rotatable on spaced external rollers 242. Tie rods 242a extending between flanges 240, 241 support a series of insulating rings 243 divided into eighteen sets. Between the rings of each set are clamped a double circle of eighty-four contacts blades 244, 245 with their inner ends arranged in a circle as shown in Fig. 7. These blades are all insulated from one another and comprise for each set, a plurality of pairs of contacts, one of which pairs has a straight end and the other has a hooked end. Each pair has a normal open or non-set position, and they are normally biased by their own resiliency in their open position.

*The Readin mechanism.*—To the left of each circle of contact blades 244 as viewed in Fig. 1 and located as shown in Fig. 2 is an interposer 246 mounted for vertical movement and normally urged upwardly by a spring 247 (see also Fig. 10). Energization of a pair of magnets 248 will rock armature 249 about its pivot point 250 and the free end of the armature will bear down on the upper edge of interposer 246 to lower it against the action of its spring. Thus the interposer may take two positions, an upper normal one as shown in full lines in Fig. 10 or a lowered one as shown in dotted lines.

In its upper position the hooked end of the interposer is in line with the hooked end of contact blade 245. When lowered, the end of interposer 246 is out of line with said hooked end of blade 245.

As shown in Figs. 7 and 10 the upper end of interposer 246 passes through a slot in a pin 251 which serves as a pivot for the interposer with spring 247 being inclined to bias the interposer and pivot pin clockwise as viewed in Fig. 10. The lower ends of the interposers pass through openings 252 in a plate 253 which plate is slidable in slots of a frame 254 in a direction parallel to the axis of the storage drum and also in a direction transverse thereto.

When plate 253 is moved to the right as viewed in Fig. 10 it will rock the interposer 246 counterclockwise and if an interposer 246 is in its lower position at such time, it will engage the adjacent blade 244 and move it to the position shown in Fig. 12 where the blade 244 snaps under the hook of blade 245. Upon withdrawal of interposer 246 to the left, the contact blades remain hooked together in the angular relationship shown to form an electrical connection therebetween. This is what may be termed the "set" position of a pair of contact blades. If the blades are already in set position when the interposer 246 is shifted, they simply remain set.

If a pair of blades is in set position, and the adjacent interposer is shifted while in its upper position, the interposer will press against the hooked end of blade 245 to snap it out of engagement with blade 244 as shown in Fig. 11 so that upon withdrawal of the interposer, the contacts return under their own resiliency to their open or non-set position. If the contact blades are initially open under such conditions the movement of interposer 246 while in its upper position will simply rock blades 244 and 245 without effecting closure and the contacts therefore remain in their open condition.

Figure 5:
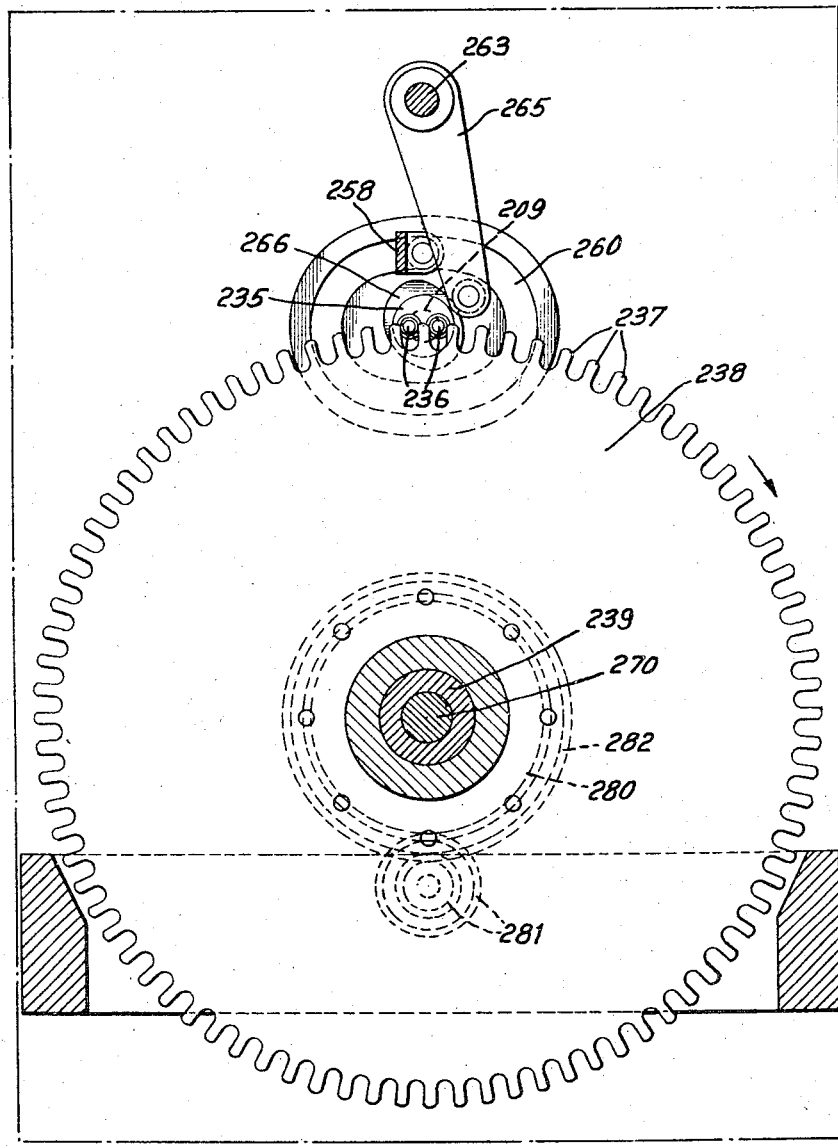
Figure 8:
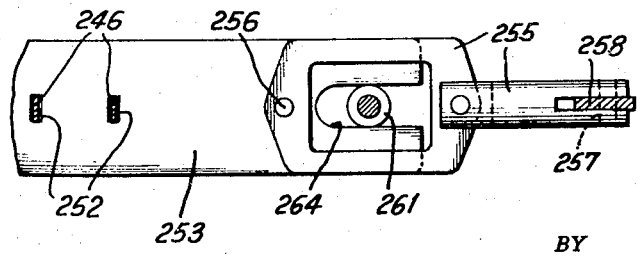
Fig. 8 is a section taken on lines 8—8 of Fig. 10.

The manner in which plate 253 is shifted axially is as follows. A toggle 255 (Figs. 8 and 10)

is pivoted at 256 to plate 253 and has pin and notch connection 257 with a bell crank 258 pivoted at 259 (Fig. 1a) whose follower roller rides in a box cam 260 secured to readin shaft 209 (see also Fig. 5). Thus during a half revolution of shaft 209 the plate 253 is given a reciprocation to shift interposer 246 (Fig. 10) to the right and back again while the drum is advanced one step. During this advance of the drum, the pair of contacts 244, 245 in line with the interposer (Fig. 7) turn clockwise and the free ends of interposer 246 are caused to follow the blades by shifting plate 253 transversely at this time. This is effected as follows. Extending into suitable slots 264 (Figs. 8 and 10) in plate 253 are rollers 261 carried by arms 262 (Fig. 1) secured to a rod 263. In Figs. 1a and 5 rod 263 has secured thereto a follower lever 265 in engagement with a cam 266 on the readin clutch shaft 209.

Pins 269 in the arms 262 (Fig. 7) will rock bell cranks 267 upon which there is supported a restoring bar 268 underlying the armatures 249.

The operation is such, that when shaft 209 makes a half revolution, the contact drum makes an advance of one step and concurrently, the interposers 246 rock in two directions; in one direction to contact blades 244, 245 and in the other direction to move with the drum. After 90° of movement of shaft 209, these movements of the interposers are reversed to return them to the position of Fig. 10.

There is a magnet 248 for each of the eighteen rings of contacts 244, 245 and at each stepping position of the drum, one or more of these magnets may be energized with the resultant setting of a corresponding number of contacts in the same axial row. Each ring of contacts is allocated to a different digit and designation as follows and as identified in Fig. 1; 9, 8, 7, 6, 5, 4, 3, 2, 1, 0, 11, 12, Space, Skip, Field duplicate, Release, Minor and Intermediate.

It will be appreciated that when any row of contacts steps from its "setting" position opposite interposers 246 (Fig. 7), any "set" contacts will be unset or restored to open position and the entire row will be thus cleared if no magnets 248 are energized. In the single step, therefore, the setting of any row of contacts will be changed, or entirely cleared, as the row advances.

*The Readout mechanism.*—Secured to shaft 270 (Figs. 1 and 7) through arms 271 is a bar 272 upon which is carried a pair of contact brushes 273 for each pair of circles of contacts 244, 245. This shaft 270 may be stepped clockwise as viewed in Fig. 7 together with the contact drum, or it may be stepped counterclockwise independently of the drum, as will now be explained.

Figure 4:
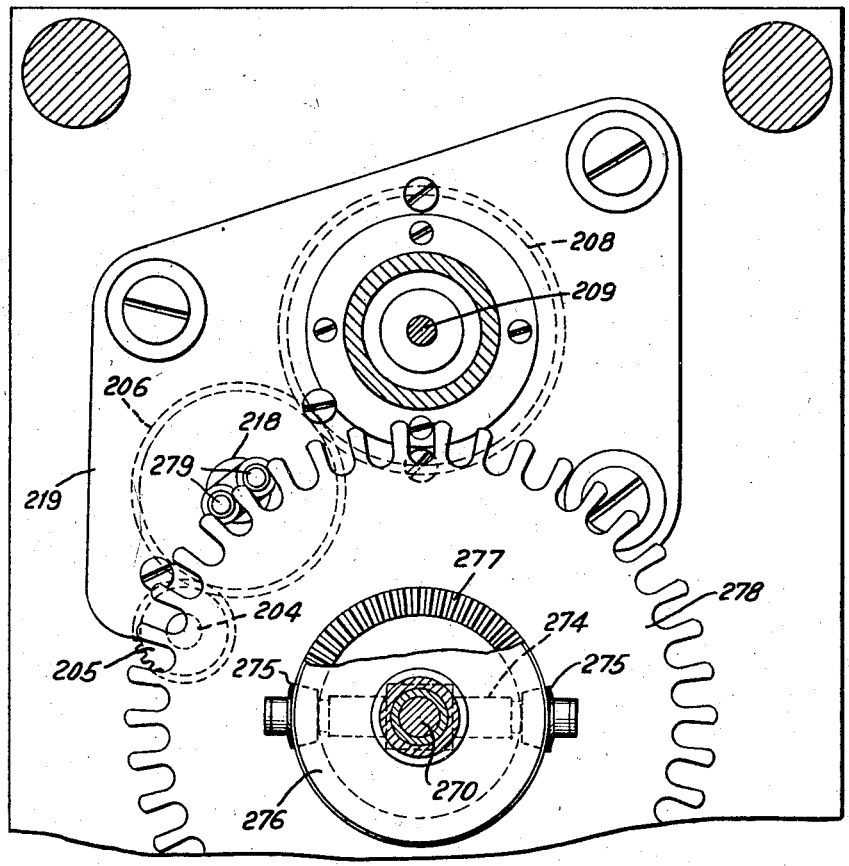

In Figs. 1a and 4 the shaft 270 has secured thereto an arm 274 upon which a pair of bevel pinions 275 are mounted. On one side of arm 274 is a bevel 276 and on the other side is a bevel 277. Bevel 277 is integral with a forty-two toothed wheel 278 whose advance is controlled by rollers 279 on the readout shaft 218.

The bevel 276 is integral with a gear 280 driven through a pair of gears 281 from gear 282 integral with the toothed wheel 238. As has been explained, when wheel 238 is stepped one tooth, the storage drum is advanced one step or one eighty-fourth of a revolution. Through the gearing 282, 281, 280 and 276 arm 274 is also turned through the same angle and in the same direction, turning shaft 270 and the brushes 273 in unison with the storage drum.

When the readout clutch is operated to cause wheel 278 to advance, turning of gear 277 will rotate arm 274, one eighty-fourth of a revolution in the opposite direction so that brushes 273 advance one step in a counterclockwise direction as viewed in Fig. 7.

Figure 13B:
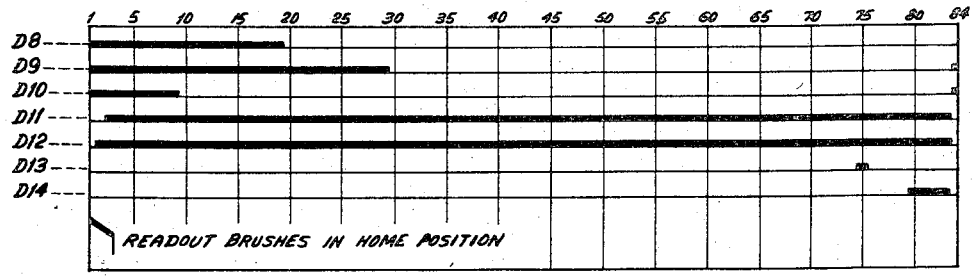
Fig. 13b is a diagram of the timing of certain positionally operated contacts.

The drum readout shaft 270 carries several cams at its extremity (Figs. 1a and 2) which operate contacts generally designated as D contacts. These contacts are controlled in accordance with the position of brushes 273. In Figs. 13a and 13b the timing of the several RO, RI and D contacts are shown and their several functions will be explained in connection with the circuit diagram.

The sequence of operations generally is as follows: Data, either numerical, alphabetical or functional, is entered on successive rows of blades during which operations, the readout shaft 270 advances with the drum. At any time after shaft 270 has left home position, the readout operation may begin, stepping shaft 270 back toward home position while the entering continues and, depending upon whether the readin is faster than the readout, shaft 270 will be stepped further clockwise or counterclockwise.

*Problem*

A representative series of operations will now be explained in connection with Figs. 28 and 29 to point out generally what takes place to punch a card C, after which the circuit diagram will be explained to set forth the specific steps of operations involved to show how the various units of the apparatus are coordinated.

In Figs. 28 and 29, three cards are shown designated as record card C, master card M, and control card D, the master card M containing perforations which are to be selectively reproduced in the record card C. For purposes of explanation, the fields of the card are separately designated a, b . . . i, j. Fields a, b, f and j are to be key punched, field d is to be reproduced under control of the similarly designated field in the master card M, fields c, e and i are to be skipped. Fields g and h are to receive "Intermediate" and "Major" data from card M.

At the bottom of Fig. 29 is a representation of the rows of contact blades of the storage mechanism with the column numbers 1 to 83 represented and the sections or groups of columns required for the setting of the data for the three cards indicated. A dot made at the coordinate intersections indicates the position in which a contact blade setting has been made under key control.

*Circuit diagram*

The manner in which the storage drum is set up will now be described and thereafter it will be explained how such setting controls the operation of the punching machine. As a preliminary, blank cards C are placed in the supply hopper 10 of the machine and a master card M containing data perforations in certain fields as in Fig. 28 is placed in the duplicating section of the machine (Fig. 20). A control card D is placed in the reading unit (Fig. 21) and this card is provided with perforations as in Fig. 28.

It will be assumed that no entries are set up in the storage drum and that the readout brushes 273 (Fig. 7) are in line with the interposer setup position as indicated in dotted lines. This may be termed the home or 1 position of the brushes 273.

Current is first supplied to main lines 290 and 291 through switch 292 (Fig. 27a) which will complete the circuit to the storage unit motor M1 (Fig. 27b) through wires 293 so that it runs continuously.

A signal circuit is also completed from line 291, wire 294, signal lamp NS, normally closed contacts R23a, wire 295, latch contacts 35 to line 290. This signal indicates that there are no entries in the storage unit left from some prior operation of the device, and that the readout brushes 273 are in position contacting the row of contacts 244, 245 in line with the interposers, i. e. the brushes 273 are in home position.

There is a further circuit completed at this time from line 290, latch contacts 35, wire 296, contacts R10b, and a drive solenoid 305 to line 291. This signal indicates that there is no card in the carriage.

*Starting circuits*

Let it be assumed that the card carriage is in its last or 81st column position wherein it holds contacts 50 (Fig. 27b) closed. This results in the completion of a circuit from line 290 (Fig. 27b), contacts 50, wire 304 (Fig. 27c), and relay R13 to line 291. Relay R13 closes its contacts R13c completing a circuit from line 290 (Fig. 27b), latch contacts 35, wire 295 (Fig. 27c), contacts R13c, the lower blade of Manual release switch 88f (in its M or manual position), relay R11 and eject magnet 79 in parallel, to line 291. Relay R11 closes its contacts R11a to provide a holding circuit through wire 295 and latch contacts 35. If switch 88f is set in its A or automatic position, the operator must momentarily close the Error release switch 88d to direct the circuit from contacts R13c to relay R11 and magnet 79.

Energization of magnet 79 will actuate the ejector (idly since no card is in the carriage) and will incidentally cause closure of the auto start contacts 84 (Fig. 27b) to complete a circuit from line 290, contacts 50, 84, trip magnet 32 and brush magnet contacts 57 to line 291. Magnet 32 causes opening of the latch contacts 35 to deenergize relay R11 and the eject magnet 79 and contacts 36 close to complete the circuit to motor 22 whereby a card C will be fed from the supply hopper 10 to the card carriage with the first column of the card in line with the row of punches 5. The carriage in the meantime has moved to card receiving position enabling opening of the last column contacts 50 and consequent deenergization of relay R13.

When the card C is fed to the carriage it closes card lever contacts 91 (Fig. 27b) to complete a circuit from line 290, contacts 35, wire 295, wire 296, contacts 90 and 91 and relay R10 to line 291 whereby contacts R10b open to interrupt the drive solenoid circuit. The relay R10 will thereafter be held through its contacts R10a and latch contacts 35.

Let it now be assumed that the card carriage is in some intermediate position with no card therein at the commencement of operations. The chime will sound as before but lamp NS will not be lighted. The operator now presses the release key 131e (Fig. 27a) of the alphabetic keyboard or the release key 171e of the numeric keyboard. Assuming the former to be depressed, it will close its contacts 135e and also the bail contacts 139. Closure of contacts 139 will complete a circuit traceable from line 290, contacts 139 and relay R1 to line 291. Before relay R1 which is a slow acting relay, opens its contacts R1a, there are two parallel circuits completed therethrough, one of which is traceable from line 290, contacts 139, R1a, the readin clutch solenoid 234, to line 291. The other is traceable from line 290, contacts 139, R1a, contacts R12, common wire 297, release key contacts 135e, release setup magnet 248 to line 291.

The readin shaft 209 will now make a half revolution and setup magnet 248 will depress its interposer 246 so that the storage drum, together with the brushes 273, advance one step and during such advance the contacts 244, 245 are set in column 1 of the drum in the 16 or "Release" circle of contacts as indicated in Fig. 29. As the readin shaft 209 turns, the R1 contacts operate and contacts R11 (Fig. 27a) close to establish a holding circuit traceable from line 290, contacts R11 and the readin clutch solenoid 234 to line 291. This holding circuit picks up before relay contacts R1a open. From the time chart (Fig. 13a) it will be noted that contacts R11 open again after fifty degrees. The parts will however continue to be driven through a complete one hundred and eighty degrees due to the inertia thereof and the disc clutch which retains engagement until declutched at the end of the movement.

The drum is now in position with its 2 column of contacts in line with the interposers 246, brushes 273 are in line with column 1 in their 2 position and the cams of the related D contacts have also moved, of which contacts D12 (see Fig. 13b) are now closed (i. e. they close when brushes 273 are in their 2 position), and complete a circuit from line 290 (Fig. 27c), contacts D12, RO7, R13, relay R23 to line 291. Relay R23 closes its contacts R23b to provide a holding circuit from line 290, contacts D12, RO7, R23b and relay R23 to line 291. It also shifts its contacts R23a (Fig. 27b) to open the circuit to lamp NS to signal that there is an entry on the drum.

The operator now closes either the storage cancel switch 88b (Fig. 27c) (or the error contacts 135c) completing a circuit from line 290, contacts D12, switch 88b and relay R2 to line 291. Relay R2 closes its contacts R2a to provide a holding circuit from line 290, contacts D12, R2a and relay R2 to line 291. It also closes a second pair of contacts R2b which complete a circuit from line 290 (Fig. 27b), latch contacts 35, wire 295 (Fig. 27c), contacts R2b, R23c (now closed), RO6, and readout clutch solenoid 214 to line 291. Solenoid 214 causes engagement of its clutch and rotation of the RO contact cams, of which contacts RO5 provide a holding circuit for the solenoid. With solenoid 214 engaged, the readout brush shaft 270 will move from its 2 position in which the brushes 273 are engaging the 1 column of the drum, back to its 1 or home position where the brushes will contact the 2 column of the drum. A circuit is concurrently completed which is traceable from line 290, contacts 35 (Fig. 27b), so called floating cam contacts 53, 54, wire 300, contacts R23d (now closed), normally closed relay contacts R15a, R13a, wire 301, the contact blades 244 and 245 and brushes 273 in the 16 or release position, pickup coils of relays R7 and R8 in parallel, wire 302, contacts RO8 to line 291. This circuit is completed as soon as relay R23 is energized and its contacts R23d closed.

Figure 27B:
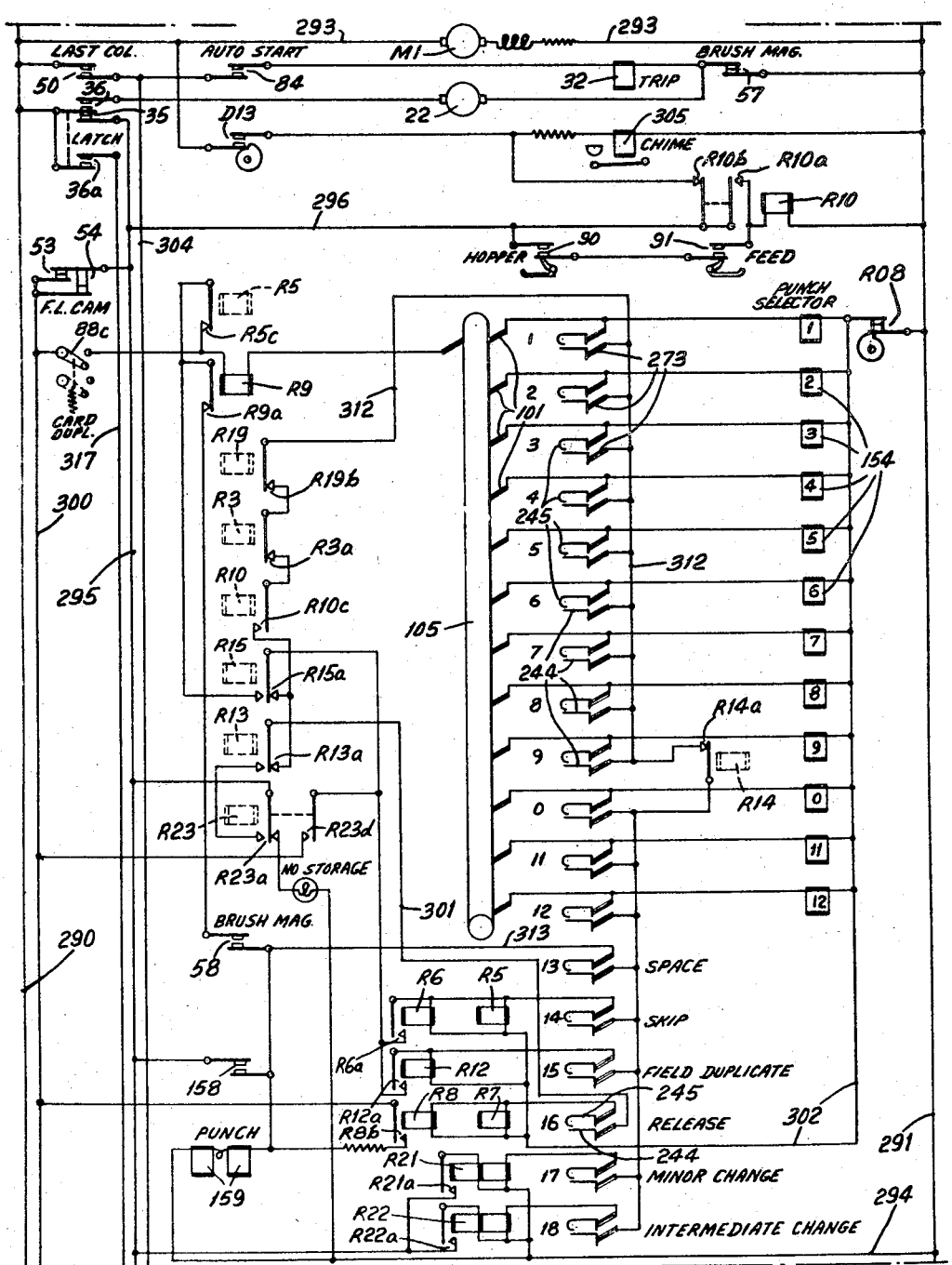

Relay R7 closes its contacts R7a (Fig. 27c), to complete a circuit from line 290, contacts 35 (Fig. 27b), wire 295 (Fig. 27c), upper blade of manual release switch 88f (if set at M or manual), contacts R7a, and release solenoid 60 to line 291. Relay R8 closes its contacts R8a to set up a holding circuit from line 290, contacts 262 (Fig. 27c), wire 299, contacts R13b, R8a, and holding coils of relays R7 and R8 to line 291. If switch 88f is set in its A position only the holding circuit through contacts R8a will be completed and the operator must then momentarily close switch 88d to complete the release solenoid circuit from wire 295 upper blade of switch 88d, contacts R7a and solenoid 60 to line 291. Energization of solenoid 60 will free the card carriage (in which there is no C card at this time) for advance to its extreme or last column position, in which it will close last column contacts 50 (Fig. 27b). At the same time, contacts R8b (Fig. 27b) complete a circuit from line 290, contacts 35, 53, wire 300, contacts R8b, punch magnet K9 and wire 294 to line 291. Magnet 159 causes raising of the skip lifter 51 (Fig. 19) and thus assists solenoid 60 in releasing the card carriage by lightening the load of disengaging pawl 47 from rack 15. It also operates motor plate contacts 202, 203 to set up the holding circuit for relays R7 and R8 just traced. The contacts 50 then complete a circuit from line 290, contacts 50, wire 304 (Fig. 27c), and relay R13 to line 291 as before. Relay R13 opens its contact R13a and R13b to deenergize relays R7 and R8 and closes its contacts R13c to complete a circuit from line 290, contacts 35 (Fig. 27b), wire 295 (Fig. 27c), contacts R13c, switch 88f (if in its M position) or switch 88d (upon momentary closure), and in parallel through relay R11 and eject magnet 79 to line 291 as before.

With magnet 79 energized, the card ejector operates and as a result the auto start contacts 84 (Fig. 27b) close to complete the above traced circuit to trip magnet 32. Magnet 32 shifts the latch contacts 36a, 35 and 36, and of these, contacts 36 complete the circuit to the card feed motor 22 which retracts the card carriage and concurrently advances the first card C from magazine 10 into the carriage and presents the first column thereof to the row of punches 5, the first column of card M to the row of brushes 101 and moves the reading brushes 194 into line with the second column of card D. Latch contacts 35 open to break any holding circuits extending therethrough.

*Data set-up circuits*

For the problem under consideration, field *a* of card C is to be perforated in accordance with alphabetic data which may or may not require punching in all thirty columns of this field. With switch 88a (Fig. 27d) set in the position shown, the apparatus is conditioned to punch by fields, that is, punching into card C will not take place until a predetermined number of columns of the storage drum have been set. The number to be set before punching starts will be controlled by a perforation made in column 1 of card D (Fig. 28) in the 11 or 0 positions. A perforation in the 11 position will delay punching until thirty columns are set on the drum and a perforation in the 0 position will delay punching until ten columns have been set.

*"Punch by fields" control.*—During the initial card feeding operations when the latch contacts 36a close, as explained, a circuit is traceable from line 290 (Fig. 27b), contacts 36a, wire 317 (Figs. 27c and 27d), through wire 310 to the contact strip 185 associated with column 1 of card D. Since there is a perforation in the 11 position of this card column, a circuit continues therethrough to the 11 or X conductor 188 and relays R20 and R19 in series to line 291. Relay R20 closes its contacts R20a and R20b and relay R19 shifts its contacts R19a. There is then a holding circuit traceable when latch contacts 35 close (before contacts 36a open) from wire 295, wire 311 (Fig. 28d), shifted contacts R19a, switch 88a, switch 88g (in its 30 column position), contacts D9, now closed, (Fig. 13b), contacts R20b, relay R20 to line 291. A parallel circuit extends also from switch 88a to contacts D10 now closed and relay R19 to line 291. Reference to Fig. 13b will show that these two relays are held until contacts D9 open, which occurs when the readout brushes 273 have been advanced past their 30 position; in other words, the relays R19 and R20 are held until thirty columns of information have been set up on the drum.

If switch 88g had been set in its 20 column position, the same circuits would be held through contacts D8, which as seen in Fig. 13b open after twenty columns of information have been set up so that by selectively adjusting switch 88g an X hole in the first column of the card will cause energization and holding of relays R19 and R20 for a selective number of keying operations.

In a like manner, if the column 1 of card D is perforated in the zero position, a circuit would be completed from wire 317 (Fig. 27d), through wire 310, contact strip 185, (column 1), zero perforation and zero contact bar 188 and relay R19 to line 291. The relay by shifting its contacts R19a will provide a holding circuit from wire 295, wire 311, contacts R19a, switch 88a, contacts D10 and relay R19 to line 291. From Fig. 13b it is seen that contacts D10 open after ten columns of data have been set up, so that for a zero perforation in card D, relay R19 is energized and held for ten steps. Relay R19 has a pair of contacts R19b (Fig. 27b) in the circuit connection designated 312 which extends to the readout brushes 273 of the storage drum and, as will be explained, the readout circuits extend through this wire, so that with relay R19 energized contacts R19b are held open to prevent such readout circuits being completed until after the selected number of columns have been set up.

Referring again to Fig. 27d, if switch 88a is moved to its open position, the pickup and holding circuits for relays R19 and R20 will be ineffective and the readout circuit is not broken by contacts R19b.

*Minor change setup.*—Before keying in the alphabetic data, the operator determines for the problem of Figs. 28 and 29 that the data in field *f* of card M is not to be automatically reproduced in the corresponding field of the card C. This data is so-called minor change data, and the operator desires to substitute therefor other information. In order to suppress the reproduction of the information on the card M, the minor key 131b (Fig. 27b) is depressed at any time before the card reaches the position where field *f* is read, and the convenient time to do this is prior to keying the alphabetic data to be punched in the first field. Operation of key 131b will close its contacts 135b and complete a circuit from line 291, contacts 135b to the 17 magnet 248 and line 291. Energization of the 17 magnet 248 will effect the setting on the contact drum in column 2 thereof, as indicated in Fig. 29. It will be noted that, as explained, the minor key does not operate the bail contacts so that the readin clutch solenoid 234 is not energized and this setting is made without advancing the storage drum.

Briefly reviewing the preliminary conditions for the chosen problem, switch 88a (Fig. 27d) is in its "punched by fields" position, switch 88f is in its A or automatic position and switch 88g is in its 30 column position so that the initial sensing of the 11 or X hole in column 1 of card D (Fig. 28) will set up conditions to prevent punching until thirty columns of data have been stored. The preliminary operation of minor key 131b (Fig. 27a) has effected a setting in column 2 of the storage drum to prepare for a change of the minor data in field f, so that instead of this data being duplicated from the card M it will be punched in accordance with new information to be set in the storage drum by the operator.

*Data setup circuits.*—The operator now proceeds to set up the data to be punched in field a of card C. In the example illustrated in Fig. 29, the alphabetic keys 131 are depressed in succession in accordance with the desired data and each key will complete circuits to energize the readin solenoid 234 and the related setup magnets 248 to effect contact settings on the storage drum in the same manner as the settings were made previously. Specifically, as an example, the operation of the J key 131 will close its contacts 135 (Fig. 27a) and also the ball contacts 139, the latter completing the circuit from line 290, contacts 139, relay R1 to line 291. A parallel circuit extends through contacts R1a, readin clutch solenoid 234 to line 291. A third circuit extends from contacts R1a, contacts R12, common 297, contacts 135 of the J key 131 and the 1 magnet 248 to line 91. A circuit branches through the second pair of contacts 135 of the J key to the 11 magnet 248 to line 291. The concurrent energization of solenoid 234 and the 1 and 11 magnets 248 will effect a setting of the 1 and 11 contact blades 244 and 245 to represent the letter J in column 2 of the drum and advance it to present the next column to the row of interposers 246 (Fig. 7). As explained in the mechanical description, the advance of the drum is accompanied by a like advance of the readout brushes 273 so that these brushes are in their 2 position and in line with column 2 of the storage drum.

In succession thereafter, the keys 131 are operated for the letters O, H and N to set up these characters on the drum.

*Space setup circuit.*—Next, the space key is operated to effect a space setting on the drum, the circuit therefor being traceable from line 290, Fig. 27a, contacts 144a, relay R1 through whose contacts R1a the circuit also energizes the readin clutch solenoid 234. A further circuit extends from contacts R1a, through contacts R12, wire 297, space key contacts 144 to the 13 or space magnet 248, thus effecting a space setting on the storage drum as indicated in column 6 of the drum, Fig. 29. Next, the keys representing Prendergast, space, New, space, York are depressed to effect appropriate settings on the drum as indicated.

*Skip setup circuit.*—Since these settings are not sufficient in number to completely traverse field a of card C, it is necessary to skip over the remaining columns, and this is done by operating the skip key 131d which will effect a setting of the skip or 14 magnet 248 as indicated in column 27 of the storage drum in Fig. 29.

The skip key closes its contacts 135d, Fig. 27a, and also the ball contacts 139 so that the storage drum is advanced during the setting of the skip data. It will be appreciated that the alphabetic data set up for field a, especially where names are concerned may be of variable extent, and that a variable number of columns will have to be skipped so that the skip key is operated after the last character to be punched in field a has been set up. When this skip setting is later sensed by the readout brushes 273, it will initiate automatic spacing for the columns of card C which are not to be punched, and the extent of this automatic spacing will be determined by the location of the skip stop hole in the 7th position of the card D, Fig. 28. As indicated therein, there is a 7 hole in the first column of field b (column 31). The manner in which the skip setting and the skip stop hole control automatic spacing will be explained later in connection with the readout operations.

The operator now proceeds to set up the data for punching in field b of card C. This data is to be numerical and for the example chosen the 0, 1, 2, 3, 4, 5, 6, 7, 8, 9 keys 117 are operated, each in turn closing the ball contacts 123 (Fig. 27a) to cause energization of the readin solenoid 234 and concurrently energizing the appropriate setup magnet 248, so that these digits are set on the storage drum as indicated in Fig. 29, the last digit 9 being set in column 27 of the drum.

*X skip setup circuit.*—Field c of card C is to be skipped and an X hole is to be punched in the first column thereof, which is a customary indication that the field is a skipped field and not inadvertently left blank. The operator depresses the X or 11 key 117 (Fig. 27a) which will close its contacts 124 and 124a as well as the ball contacts 123. The effect of this is to energize the 11 and 14 magnets 247 together with the readin clutch solenoid 234 through circuits now familiar. This will result in a setting on the storage drum as indicated in column 38 (Fig. 29). The skip setting when subsequently sensed will initiate automatic spacing across field c of the card C, and this setting is terminated by sensing of a skip stop or 7 hole in the first column of field d of card D, Fig. 28. This card also has a 4 hole in column 44 which will automatically cause duplicating of the data from field d of card M in the card C. This will take place automatically as will be explained and requires no key setting by the operator, so that the next setting to be effected in the drum is a skip setting for field e.

In this case, by way of example, it is desired to skip the field and omit the X punching in the first column thereof, so that the operator instead of pressing the X key 117 presses the skip key 131d, which closes its contacts 135d and also ball contacts 139 to energize the 14 or skip magnet 248 and advance the drum. Again this skip setting will cause automatic spacing across field e and the skip stop hole in the 7th position in the first column of field f of the D card (Fig. 28) will terminate the automatic spacing when field e has been skipped. The next key operations are for the data to be entered into field f as a substitute for the data in field f of card M and the operator now presses the 6 key 117 repeatedly to set up the value 6666.

It may be mentioned at this time that for the three fields f, g and h there are perforations in the first columns of the corresponding fields of the card D (Fig. 28) which, when sensed, will cause the data in these fields of card M to be automatically duplicated. Where the preliminary minor change setting has been made as explained, in column 2 of the storage drum, the automatic duplication is suppressed for field f so that other data may be substituted therefor. Thus, for the example, the amount 6666 is to be punched into field *f* from the storage drum instead of the amounts 3333 from the corresponding field of card M. Fields *g* and *h* require no setting on the drum, and these will be duplicated automatically from the M card under control of the perforations in the D card. Field *i* is to be skipped and an X indication made in the first column thereof so that the operator, just as for field *c*, will depress X key 117 and effect a setting in the 14 and 11 positions of column 44 of the drum as indicated. This action will initiate automatic spacing which will be interrupted upon the subsequent sensing of the 7 or skip stop perforation in the first column of field *j*, card D, Fig. 28. Field *j* is to receive punching in the first six columns thereof and the operator proceeds to press the keys B, B, B, C, C, C. This completes the setting up of data for the card and key 131E is then operated to effect a setting in the 16 or release column of the storage drum which is column 51, as indicated in Fig. 29.

The operator may now proceed to set up the data for a second card in the same manner as explained, and the significance of the settings for the second card will be briefly set forth.

*Intermediate change setup.*—A setting is made in the 18 position through depression of the intermediate key 131a (Fig. 27a). This key does not operate the bail contacts 139 so that the drum is not advanced and will, when it is later sensed, prevent the automatic duplication of the data in the intermediate field *g* as well as in the minor field *f* so that the operator may punch change data in these two fields. Next the operator may press the alphabet keys in accordance with the name William Lang and then the skip key to automatically space across the remainder of field *a*. Next, the keys are operated for the entry of the digits 9, 8, 7 . . . 0, in field *b*. The X punching and skip setting are made for field *c*, then the skip setting for field *e*, the minor change data 9999 and the intermediate change data 8888 followed by the X punch and skip setting for field *i*. Then, six columns are set to represent the value 111111 to be punched in field *j* followed by the release setting in the 16 position of the drum.

It will be noted in Fig. 29 that the settings have taken more than a complete revolution of the drum and in the meantime prior set data will have been read out so that these positions of the drum are again available to receive settings. From the mechanical description it will be recalled that data set up in a drum column remains set until that column is again at the setting position and the old data is cleared concurrently with the setting of new data. Thus in column 1 of the drum there is a 16 setting which will be cleared when the new skip setting is made therein. Thus, 1's are now set in columns 2 to 7 and the last release setting is made in column 8 of the drum. After this is made, the operator will continue to set up the data which it is desired to punch in a third card and so on.

Readout operations

The foregoing explains the manner in which the operator manipulates the keys to effect settings in the storage drum and this is done column by column without interruption. There will now be described the manner in which the data set up in the drum, controls the punching and feeding operations and also the manner in which the master card M and the control card D exercise certain control. When the first entry was made on the drum (that is, the letter J) and the drum advanced one step, together with the readout brushes, contacts D12 closed (see Fig. 13b) and a circuit was recompleted to energize relay R23. This circuit is traceable from line 290 (Fig. 27c), contacts D12, R07, R13, relay R23 to line 291. As the drum continues stepping as further entries are made therein, the relay R23 remains energized through the circuit traced and also directly through contacts D11, which close one step after contacts D12 close as shown in Fig. 13b.

*Start of punch by field operation.*—When the operator entered the digit 2 in column 30, as explained, the drum advanced to present its column 31 to the interposers 246 and during such movement the readout brushes 273 are still in line with column 2 of the drum and move from their 29th to their 30th position, and at the same time contacts D9 (Fig. 27d) and 13b open to deenergize relays R19 and R20 which permits contacts R19b (Fig. 27b) to reclose. Since relay R23 is energized at this time, a circuit now is traceable from line 290, latch contacts 35, wire 295, contacts 53, wire 300, contacts R23d (now closed), contacts R15a, contacts R10c (now closed, since there is a card in punching position), contacts R3a, R19b, wire 312, brush 273 in the 1 position, contacts 244, 245, the 1 magnet 154, contacts R08, to line 291. The circuit from wire 312 branches through contacts R14a to brush 273 in the 11 position, contacts 244, 245, and the 11 magnet 154 and thence through contacts R08 to line 291.

*Punch and brush advance circuits.*—In this manner the 1 and 11 punch interposers are advanced and, as explained in the mechanical description, they close contacts 158 which complete a circuit from line 290, contacts 35, wire 295, contacts 158, punch magnet 159, wire 294 to line 291. This will cause punching in the 1 and 11 positions in column 1 of the card to represent the letter J therein. As an incident to the punching operation, the floating cam contacts 53, 54 open to interrupt the punch selector circuits and the card advances to present column 2 thereof to the row of punches. As the punches penetrate the card, the motor plate contacts 202, 203 (Figs. 14, 27c) close and a circuit is completed from line 290, contacts 203, wire 318, contacts R10d now closed, contacts R15b, R23c now closed, contacts R06 and readout clutch solenoid 214 to line 291.

Energization of solenoid 214 will cause rotation of the RO contacts of which contacts RO5 close a holding circuit and the mechanical action is such that the readout brushes 273 move into engagement with column 3 of the drum in which the contacts are set to represent the letter O.

*Minor change readout circuit.*—The minor change setting in position 17 of column 1 of the drum is also sensed during the punching of the letter J, and thus a circuit is traceable from line 290 (Fig. 27b) to wire 312 as before, thence through contacts R14a and brushes 273 in position 17, thence through contacts 244 and 245, relay R21 and wire 294 to line 291. Relay R21 closes its contact R21a to provide a holding circuit traceable from line 290, latch contacts 235, wire 295, contacts R21a, relay R21, and wire 294 to line 291. This relay will accordingly remain energized until the latch contacts 235 open during the next subsequent card feeding operation.

With the readout brushes sensing column 3 of the card, punch selecting circuit will be completed upon reclosure of the floating cam contacts 53, 54 to energize the 11 and 6 magnets 154 to punch the letter O in the second column of the card C. Concurrently, the readout solenoid 214 is energized, advancing the brushes to the next column and it in turn is sensed to cause punching in the next column of the card, and this is repeated until the brushes sense column 6 in which the space setting occurs.

*Space readout circuit.*—The circuit is then traceable from line 290 to the wire 312 as before and extends through contacts R14a to the brushes 273 in the 13 or space position, thence through wire 313 directly to the punch magnet 159 and wire 294 to line 291. This direct operation of the punch magnet will cause operation of the carriage escapement and the card accordingly will advance without receiving punching in the skipped column.

In succession thereafter, each of the other characters set up for punching the field a are sensed and as each is read, the readout solenoid operates to advance the brushes relatively to the drum until after the last letter K is punched in column 25 of card C of Fig. 29.

*Skip readout circuit.*—Thereafter, the brushes sense the skip setting in position 14 of column 27 of the drum, and this will complete a circuit from line 290, to wire 312 as before, contacts R14a, brushes 273 in the 14 or skip position, contacts 244, 245, relays R5 and R6 in parallel, wire 302, contacts RO8 to line 291. Relay R6 closes its contacts R6a to provide a holding circuit traceable from line 290, contacts 35, wire 295, contacts 53, wire 300, contacts R23d, R6a, relays R5 and R6, wire 302, contacts RO8, to line 291.

Figure 27C:
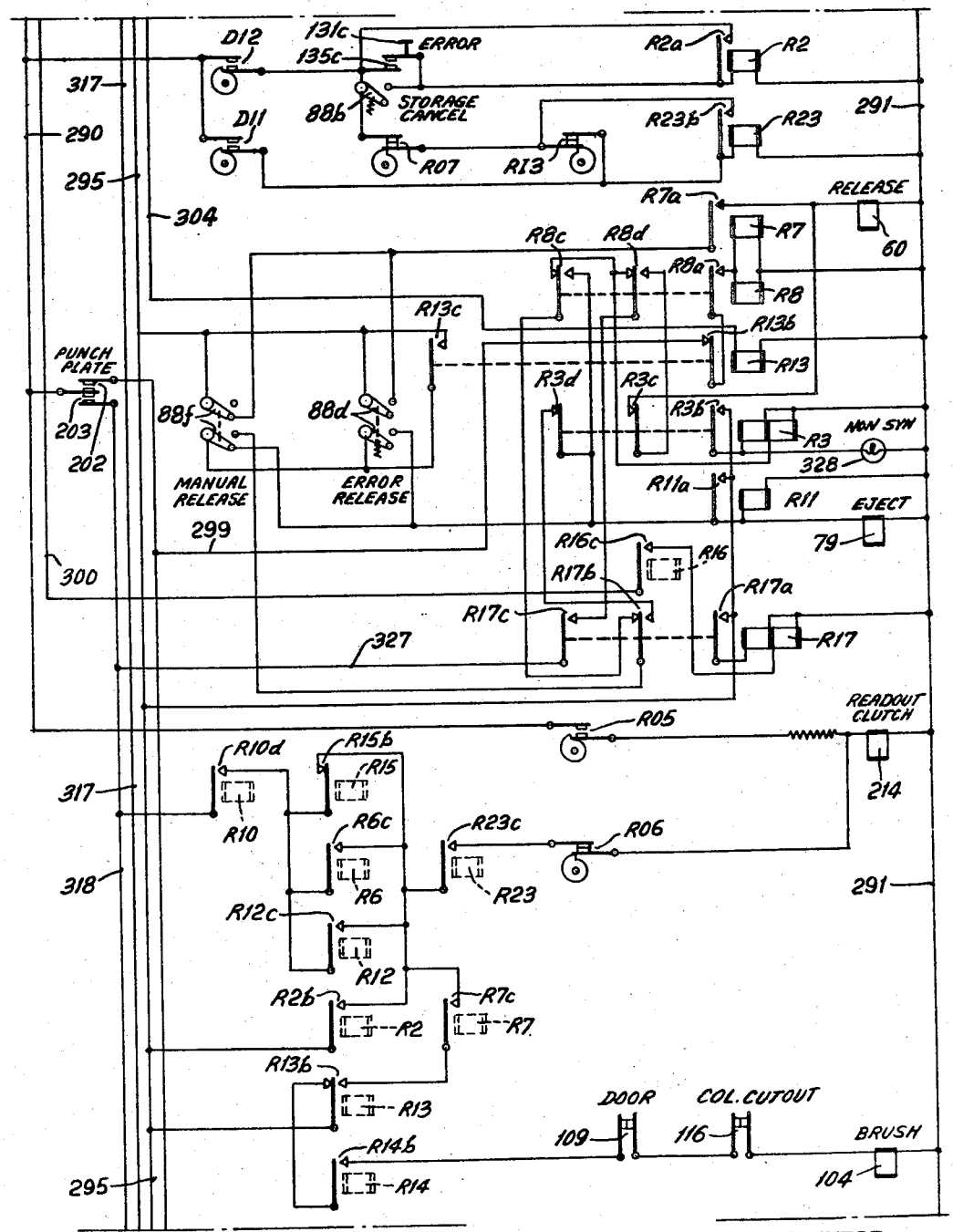
Figure 27D:
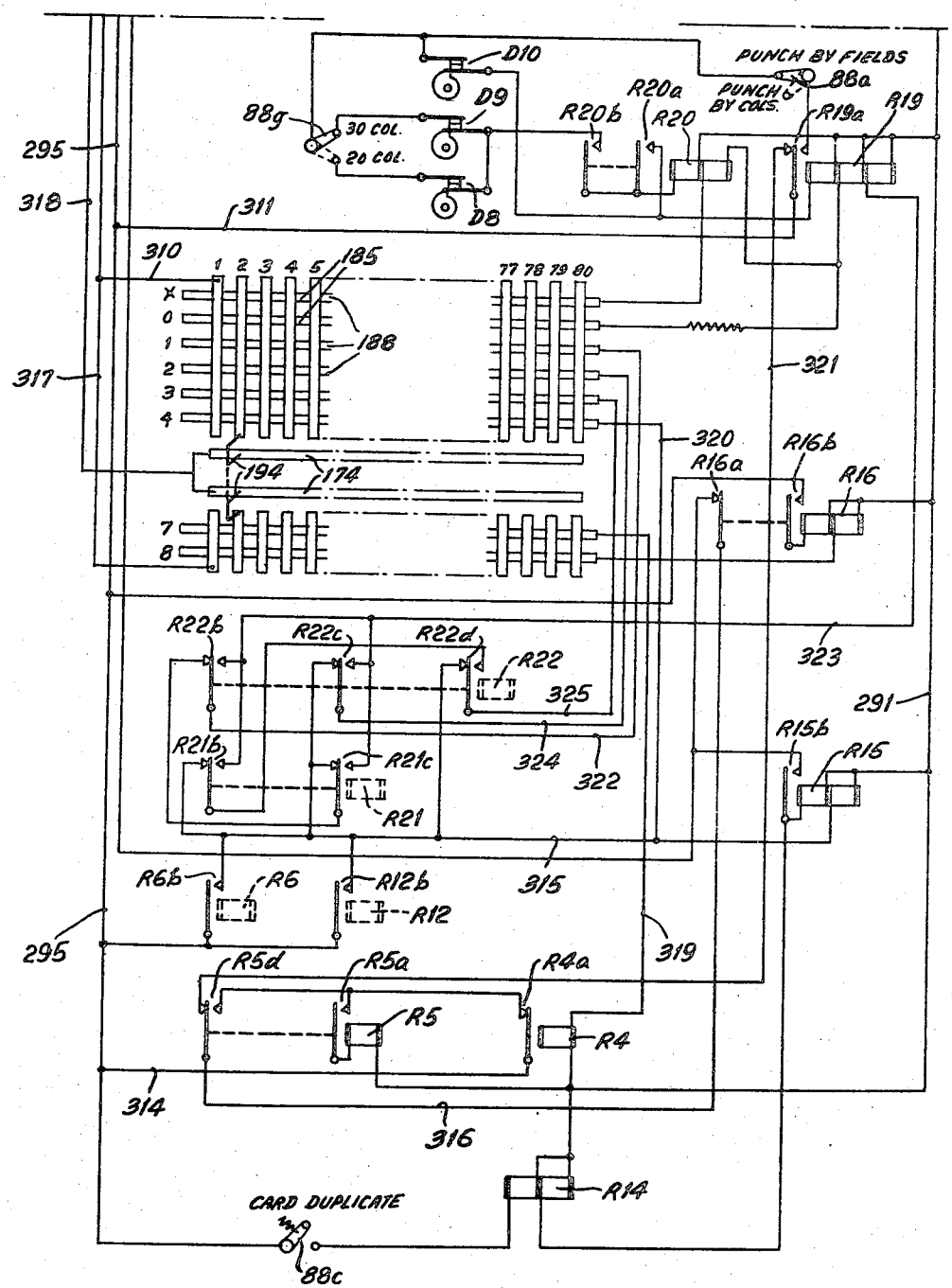

Relay R5 closes a pair of contacts R5a (Fig. 27d) to provide a further holding circuit through a coil of relay R5, which is traceable from wire 295, which extends to the latch contacts, wire 314, contacts R4a, R5a, holding coil of relay R5, to line 291. Thus, relay R5 will remain energized until relay R4 is picked up in response to the sensing of a skip stop signal in control card D as will be explained. In Fig. 27d relay R6 closes a pair of contacts R6b to complete a circuit from wire 295, contacts R6b, wire 315 to relay R15 and line 291. Relay R15 opens its contacts R15b (Fig. 27c) so that the circuit to the readout clutch solenoid 214 is not completed through these contacts.

Relay R15 shifts its contacts R15a (Fig. 27b), so that there is a circuit now traceable from line 290, latch contacts 35, contacts 53, wire 300, contacts R23d, contacts R15a now shifted, contacts R9a, brush contacts 58 now closed, punch magnet 159, wire 294 to line 291. The energization of the punch magnet will cause spacing as before, and if relay R15 is held energized this circuit will be repeatedly completed through the opening and closing of the floating cam contacts 53, 54. Relay R15 is held energized through the circuit in Fig. 27d, traceable from wire 295, wire 314, contacts R4a, R5d shifted, wire 316, contacts R16a, contacts R15b, relay R15 to line 291. Thus, upon sensing of the skip setting relays R5 and R6 (Fig. 27b) are energized and the holding circuit is provided for relay R5 which in turn energizes relay R15 and it is provided with a holding circuit and shifts its contacts R15a (Fig. 27b) so that repeated spacing takes place.

During the sensing of the skip setting and upon the first operation of the motor plate thereafter, the circuit for the readout solenoid 214 is completed from line 290 (Fig. 27c), contacts 203, wire 318, contacts R10d, R6c now closed, R23c, RO6 and solenoid 214 to line 291. The circuit follows this path inasmuch as relay R15 is energized, and its contacts R15b, through which the circuit formerly flowed, is now open. Since the relay R6 is held through the contacts RO8, as previously traced, these contacts will break the circuit during the operation of the readout clutch so that, when the brushes 273 have advanced from the position in which they sense the skip setting to the next column, there will be no circuit path for the readout clutch during the now ensuing space operations, and the readout brushes will await completion of the spacing.

*Brush magnet circuit.*—The automatic spacing circuit as traced above passes through the brush magnet contacts 58. The manner in which these are closed at the time is as follows.

It will be recalled that, when a skip setting was sensed, relays R5 and R6 became energized and through contacts R6b (Fig. 27d) relay R15 became energized and held through a circuit through contacts R16a and R15b. This circuit has a branch through which relay R14 is energized as follows: from wire 295 (Fig. 27d), wire 314, contacts R4a, R5d (shifted), wire 316, contacts R16a, R15b, and relay R14 to line 291. The relay R14 will therefore also be held until contacts R4a open. In Fig. 27c relay R14 closes its contacts R14b to complete the circuit from wire 295, contacts R13b, R14b, 109, 116, and brush magnet 104 to line 291. Magnet 104 closes contacts 48 through its armature.

During the succession of automatic spacing or skipping operations, contacts R15a (Fig. 27b) are in shifted position to prevent completion of readout circuits to wire 312 and the brushes 273, and contacts R5c are open to prevent circuits through relay R9 and the master card contact roll 105.

*Skip stop circuit.*—When column 30 of card C arrives at the punches, column 31 of card D will be in its sensing position and as the next spacing operation takes place to advance card C from column 30 to 31, the incidental closure of the motor plate contacts 203 (Fig. 27c) will complete a circuit from line 290, contacts 203, wire 318 (Fig. 27d), common plate 174, wiper 194, strip 185 in line with column 31 of card D, the 7 hole therein, 7 conductor 188, wire 319, relay R4 to line 291. Relay R4 will thereupon open its contacts R4a to drop out relays R5 and R15 and relay R15 in turn shifts its contacts R15a (Fig. 27b) to enable resumption of readout operations.

*0 hole delay circuit.*—In Fig. 28 it is noted that there is also a 0 hole in column 31 of card D signifying that punching is not to be effected in field b of card C until ten columns of data are set up in advance. The circuit through this hole is traceable concurrently with that for relay R4 as follows: from line 290 (Fig. 27c), contacts 203, wire 318 (Fig. 27d), plate 174, wiper 194, strip 185 (column 31), 0 hole relay R19 to line 291. Relay R19 is held energized as already explained through contacts D10 until the brushes 273 are ten steps from home position. If, obviously, the brushes are that far ahead, relay R19 will not be held and no delay is required.

As soon as relay R4 is energized and readout resumes, column 28 of the drum will control punching of a 0 in column 31 of card C (Fig. 29) through familiar circuits and now brushes 273 successively contact columns 29 to 37 of the drum to punch the data therein in the rest of field b of card C.

When column 38 is sensed, the 11 setting will cause an X hole to be punched in column 42 of the card and concurrently the skip setting in position 14 will energize relays R5 and R6 (Fig. 27b) as before and automatic spacing of the cards will take place, while further sensing of the drum is suspended.

Since card D (Fig. 28) has a 7 or skip stop hole in column 44, the sensing of this hole (just before card C advances column 44 thereof to the punches) will energize relay R4 as before to interrupt further skipping and resume drum sensing operations.

*Duplicate control circuit.*—Concurrently with the sensing of the 7 hole in card D, the duplicate hole 4 is also sensed, and this will now condition the circuits so that the data in field $d$ of card M is punched in field $d$ of card C. The initiating circuit is traceable from line 290 (Fig. 27c), contacts 203 (closed just before the cards escape to present column 44 to the punches), wire 318 (Fig. 27d), plate 174, wiper 195, 4 hole, strip 185 of column 44, 4 conductor 188, wire 320, and relay R15 to line 291. A holding circuit is thereby established traceable from wire 295, contacts R19a, wire 321, contacts R5d, wire 316, contacts R16a and R15b to relay R15 and line 291.

Relay R15 shifts its contacts R15a (Fig. 27b) so there is now a circuit traceable from line 290, contacts 35, wire 295, contacts 53, wire 300, contacts R23d (closed), R15a (shifted), contacts R5c, relay R9, contact roller 105, 2 perforation in column 44 of card M, 2 brush 101, 2 magnet 154, contacts RO8 to line 291. As before, magnet 154 advances the related interposer and closes contacts 158 to energize punch magnet 159 to punch a 2 in column 44 of card C followed by spacing to the next column where the circuit is repeated.

It is to be noted that, while duplicating takes place, brushes 273 are standing on column 40 of the drum but the circuits thereto are broken. It is to be further noted that energization of relay R15 is accompanied by energization of relay R14 as before, and the latter opens its contacts R14a (Fig. 27b). This is to prevent back circuits in the event column 44 of the drum contained a multiple setting in the position 2, for example, and in one of the positions 0, 11 or 12. In such case the circuit through the 2 hole in card M would attempt to pass through the 2 brush 273 and down through wire 312 to the 0, 11 or 12 brush to the 0, 11 or 12 magnet 154. By inserting contacts R14a, this back circuit possibility is averted.

The energization of relay R14 has also closed its contacts R14b (Fig. 27c) to energize brush magnet 104 to elevate the brushes 101 against card M and incidentally closed contacts 58. Where there is a hole in each column of field $d$ of card M, the duplicating circuit energizes relay R9 as traced and the corresponding hole is punched in card C.

*Space circuit in a duplicated field.*—Where a column in card M (field $d$) is blank, the duplicating circuit will, of course, not be completed and instead there will be an automatic spacing or skipping operation. The circuit therefore is traced from line 290 (Fig. 27b), contacts 35, wire 295, contacts 53, wire 300, contacts R23d, R15a, R5c, R9a (closed because R9 is not energized due to absence of a hole in card M), contacts 58, and punch magnet 159, wire 294, to line 291.

Thus, upon sensing of the duplicate hole 4 in card D, readout operations are suspended and data in card M is duplicated in card C and, where there are no holes in card M, automatic spacing takes place and continues until relay R15 is deenergized. Such deenergization is brought about by the sensing of an X or 0 hole in card D or a release hole in position 8. For the present example there is a 0 hole in column 47 which is sensed as column 46 of card C is being punched. The sensing circuit is as already traced in Fig. 27d to energize relay R19 and hold the same through contacts D10 if the brushes 273 are less than ten steps from home position. The relay R19 shifts its contacts R19a to open the holding circuit for relay R15.

Readout resumes and the next setting read is the skip or 14 setting in column 39 of the drum which, as obviously explained, energizes relays R5 and R6 to initiate automatic spacing until the skip-stop hole 7 in column 50 of card D is sensed, whereupon normal readout operations resume. During this skipping operation field $e$ of card C passes the punches without being punched, even though there are holes in field $e$ of card M. Duplicate punching is prevented by the opening of contacts R5c (Fig. 27b) during this period, so that no current is led to the roller 105 of card M.

*Minor change circuit.*—When column 49 of card C is at the punches, column 50 of card D is read, and as noted in Fig. 28, this column contains a 1 hole which will normally cause duplication of the data in field $f$ of card M into card C. It will be recalled that the "minor change" setting in the 17 position of column 2 of the drum had previously energized relay R21 and this relay is still energized at this time. Therefore, when the 1 hole is sensed, a circuit is traceable from line 290 (Fig. 27c), motor plate contacts 203, wire 318 (Fig. 27d), plate 174, wiper 194, strip 185 of column 50, 1 conductor 188, wire 322, contacts R22b, R21c (shifted), wire 323, c relay R19 to line 291. Relay R19 in the now familiar manner will set up a holding delay circuit if contacts D10 are closed. If they are open, the relay drops out again when the cards advance a step and reading of the substitute data 6666 in columns 40 to 43 of the drum continues and punch circuits are completed to punch this value in field $f$ of card C.

*Intermediate data punch circuits.*—When the last column of field $f$ is being punched, the first column of field $g$, card D is being sensed and as this contains a 2 perforation a circuit is completed from line 290 (Fig. 27c), contacts 203, wire 318 (Fig. 27d), plate 174, wiper 194, strip 185, (column 54), 2 hole in card D, 2 conductor 188, wire 324, contacts R22c, wire 315 and relay R15 to line 291. Relay R15 as before sets up a holding circuit and also energizes relay R14 in the same manner as explained for the sensing of a 4 hole in card D; that is, the duplicating brush magnet 104 is energized and the circuits are directed through roller 105 (Fig. 17b) and the duplicating brushes 101 to read the perforations 4444 in field $g$ of card M and punch this data in field $g$ of card C.

*Major data punch circuits.*—When the last column of field $g$ is being punched, the first column of field $h$, card D is being sensed, and as this contains a 3 perforation a circuit is completed from line 290 (Fig. 27c), contacts 203, wire 318 (Fig. 27d), plate 174, wiper 194, strip 185 (column 58), 3 hole in card D, 3 conductor 188, wire 325, contacts R22d, wire 315, and relay R15 to line 291. The effect of this is to maintain relay R15 energized so that duplicating continues and the data 5555 in field $h$ of card M is punched in field $h$ of card C.

When the last column of field $h$ is being punched, the first column of field $i$ of card D is sensed and as this contains a 0 hole the circuit is completed therethrough to energize relay R19 and break the holding circuit of relays R15 and R16 to terminate duplicating and switch the circuits to the drum readout brushes 273, which are now at column 44 containing an X and 14 (skip) setting. The effect of this is the same as when column 38 was sensed, namely, the columns of field $i$ will be automatically spaced past the punches without receiving perforations except an X hole in the first column until column 70 of card D is sensed and the skip stop hole 7 therein terminates the automatic spacing.

Thereafter, columns 45 to 50 of the drum are read to control punching of BBBCCC in the first six columns of field $j$ and as the sixth column is punched, brushes 273 advance to sense column 51 of the drum in which there is a release or 16 setting. Sensing of this setting will cause energization of relays R7 and R8 (Fig. 27b) and contacts R7a (Fig. 27c) close to energize the release solenoid 60 through a circuit from wire 295 (Fig. 27c), switch 88f (set at M), contacts R7a and release solenoid 60 to line 291. This circuit is only completed if switch 88f is set in its M or manual position. When set in its A or automatic position, other circuits are effective as will be explained presently. With solenoid 60 energized, card C is advanced to its last column position to close contacts 50 (Fig. 27b) which pick up relay R13 (Fig. 27c) as before and its contacts R13c then complete the circuit to the eject magnet 79 followed by closure of the auto start contacts 84 (Fig. 27b) and energization of trip magnet 23 to feed in a new card.

When the new or second card C has its first column at the punching position, the latch contacts 35 will reclose and the brushes 273 will be in line with column 52 of the drum (Fig. 29). During the card feeding operation the circuit through column 1 of card D is completed to energize relays R19 and R20 so that, if less than thirty columns of data are set up for next card, punching is suspended. If more than thirty have been set up punching immediately proceeds to punch W in column 1 of the second card and concurrently the 18 position set up in column 52 of the drum will complete a circuit to energize relay 122 (Fig. 27b) so that later duplication of data from the minor and intermediate fields $f$ and $g$ will be suppressed so that key set data 9999 and 8888 (set in columns 77—80 and 81—84 of the drum) will be substituted therefor. Thereafter, operations continue as explained for the first card, terminating in ultimate sensing of the release setting in column 5 of the drum to feed a third card and so on.

Synchronizing operations

In cases where a fixed number of columns are to be punched in the last field $j$ for each card C, provision is made to insure that the fixed number of drum settings is made and no more or less. For this condition the switch 88f (Fig. 27c) is set in its A or automatic position, the release or 8 hole is made in the column of card D following the last punching column (column 76 for the example where six columns only are to be punched) and the drum release setting is made as before, i. e. following the last punch data setting. Three separate conditions may then occur: first, the correct number of columns may be set up; second, too many columns may be set up before the release setting is made; or, third, too few columns may be set up before the release setting is made. These three conditions will now be separately considered.

*Correct number of settings.*—When, as in the example of Figs. 28, 29, six columns are to be punched in field $j$ and six drum columns are set before the release setting, the operation is as follows. When the sixth column of field $j$ is being punched, column 76 of card D is being sensed and a circuit is completed from line 290 (Fig. 27c), contacts 203, wire 318 (Fig. 27d), plate 174, wiper 194, strip 185 (column 76), 8 hole in card D, 8 conductor 188 and relay R16 to line 291. Relay R16 closes its contacts R16b to set up a holding circuit through wire 295 and the latch contacts 35, so that relay R16 will remain energized until a new card is fed. It opens its contacts 16a (Fig. 27d) to break the holding circuit of relay R15 (if relay R19 is deenergized due to advance settings) and closes its contacts R16c (Fig. 27c) to energize relay R17 upon reclosure of the floating cam contacts 53. This circuit is traceable from line 290 (Fig. 27b), contacts 35, 53, wire 300 (Fig. 27c), contacts R16c and relay R17 to line 291. Relay R17 closes contacts R17a to hold through wire 295 and latch contacts 35 until a new card is fed. As before, the punching of the sixth column of field $j$ is accompanied by advance of the cards and also the brushes 273 which are now at column 51 of the drum, wherein there is a release setting in portion 16.

The readout circuit is then established in Fig. 27b as before to energize relays R7 and R8 and relay R8 shifts its contacts R8b to complete a circuit to energize punch magnet 159 to space the cards and incidentally close the motor plate contacts 202 and 203 (Fig. 27c). A circuit is then traceable from line 290, contacts 203, wire 318, wire 327, contacts R17c, R8d (shifted), R3c and solenoid 60 to line 291. The carriage is thereby released to advance to its last column position, wherein relay R13 is energized to open its contacts R13b (Fig. 27c) to drop out relay R8 and operation resumes as before to eject the card and feed in a new card.

*Too many drum settings.*—Assume now that the operator has set up seven columns in the drum. As before, the 8 hole will be sensed in card D as the sixth column of field $j$ is punched and relays R16 and R17 will be energized and held. The incidental stepping of the brushes 273 will align them with the superfluous columnar setting and instead of the circuit through a 16 setting, there will be some other readout circuit. Specifically, relay R8 will not be picked up and, when the contacts 203 close, as a result of the circuits closed by the erroneous setting, there will be a circuit traceable from line 290, contacts 203, wires 318, 327, contacts R17c, R8d (not shifted), relay R3 to line 291. Relay R3 closes its contacts R3b to set up a holding circuit through wire 295 and the latch contacts 35 and also a parallel circuit through lamp 328 to indicate non-synchronism. It also opens its contacts R3a (Fig. 27b) to prevent completion of any further readout circuits, except through the 16 setup position and opens its contacts R3c (Fig. 27d) to prevent completion of the release solenoid circuit. With relay R3 energized (and lamp 328 lighted), it is now necessary to clear the storage unit by closing the error key contacts 135c (Fig. 27c) or the storage cancel switch which, as has been explained, will cause the brushes 273 to advance to home position without reading the settings on the drum, except the 16 or release setting which will energize relays R7 and R8 as before and set up their holding circuits. The operator thereafter closes the error release switch 88d (Fig. 27c) to complete the circuit to the eject magnet 79 and as a result the card is ejected and a new card fed to the carriage.

*Too few drum settings.*—Assume now that the operator has set up only five columns for field j and then operated the release key to effect a release setting in column 50 of the drum. Accordingly, this release setting will be read before the release hole in card D is sensed and will cause energization of relays R7 and R8. Relay R8 will close its contacts R8b (Fig. 27b) to effect a space operation and the release solenoid circuit will not be completed since switch 88f is set at A and relay R17 is not energized. Operations proceed and, if there are other settings, the card will be punched and spaced (with data set up for the following card) until the 8 hole in card D is sensed whereupon relays R16 and R17 become energized and held. A punch operation following this will cause completion of the circuit to relay R3 and lamp 328 as before. To release the carriage the release key is now operated to effect a release setting and then the storage cancel switch 88b (Fig. 27c) together with the error release switch 88d. This will cause the readout brushes 273 to advance and the release relays R7 and R8 will be energized when their setting is reached and will in turn complete the circuit to the release solenoid 60 to advance the cards to last column position from which the card C may be ejected as already explained. The solenoid circuit is from wire 295, switch 88d and contacts R7a to solenoid 60.

Briefly setting forth the conditions of synchronization, if the operations are correct there will be a setting of relays R16, R17 followed by setting of relays R7 and R8. If there are too many drum settings, the setting of R16 and R17 will be followed by a setting which will energize the lamp 328. If there are too few settings, relays R7 and R8 are set up momentarily and punching continues until R16 and R17 are set up. When this setting is followed by any other setting, the lamp 328 will indicate the error.

Storage cancellation

With the machine set for punching by fields, i. e. with switch 88a (Fig. 27d) closed, the reading out of data in field a, for example, is delayed until thirty columns of data are set up on the drum. If during such setting period the operator is conscious of having made an error as by depressing a wrong key, she will proceed as follows. Close the contacts 135c or switch 88b (Fig. 27c) to energize relay R2 which, as explained, will step the brushes 273 back to home position. Since relays R19 and R20 are energized at this time, no readout circuits will be completed and the setup positions past which the brushes 273 are moved will accordingly be by-passed or in effect cancelled, since they will not be read out subsequently because the brushes have passed them by. With the brushes back in home position, the operator will then proceed to rekey the data and, if this is correct, punching will begin after thirty settings or less, depending upon the field size for which the machine has been conditioned.

It may be mentioned at this point that due to the greater rapidity of machine operations as compared with the speed at which an operator can key data, the readout brushes 273 will generally follow up the set data quite closely, so that the brushes are idle while a field is being set up, so that upon the operator's becoming aware of having made an error the error key 131C may be immediately depressed. If, when the error is noted, the punch is still operating, the operator will pause until punching ceases (which is an indication that the field being set up has been reached) before pressing the error key. This is to prevent any unread data for earlier fields or columns being skipped when the error key is operated and only the particular field being set up will be cancelled.

*Synchronization when punching in last card column.*—In cases where there is to be punching in the last columns of card C, the 8 hole in card D is not required and the operation is as follows. When the 80th or last column is punched, the carriage escapes to its 81st or last column position, closing contacts 50 (Fig. 27b) and energizing relay R13 (Fig. 27c) as explained. If the data has been correctly entered in the storage drum, there will be a release setting succeeding the data setting for the last card column. As the card escapes from its 80th column position, this release setting is sensed to energize relays R7 and R8 in the familiar manner. A circuit is then completed from wire 295 (Fig. 27c), contacts R13c (now closed), switch 88f (set at A), contacts R17b, R8c (shifted), and eject magnet 79 to eject the cards.

If the release setting is not present (due to an error), relay R8 will not be energized and the circuit will extend from contacts R17b, through contacts R8c (not shifted) to relay R3 to light lamp R3 and indicate the non-synchronism. If the release setting is sensed before the last card column is punched (due to an omitted data setting), the energization of relays R7 and 38 is ineffective since circuits through their contacts are dependent upon closure of contacts R13c. Therefore, the card is spaced to its last column position by data in subsequent columns with the result that, when the last column is punched, there will be no concurrent sensing of a release setting and lamp 328 will be lighted as before.

*Punching by columns.*—If switch 88a (Fig. 27d) is open, there is no delay in reading out the setup data and the drum columns are read in uninterrupted succession. Switch 88f is set at M for this type of operation and the synchronizing circuits are ineffective. Thus, when a release setting is read, relays R7 and R8 are picked up and the circuit is immediately completed from wire 95, switch 88f (set at M), contacts R7a and release solenoid 60 to line 291. No cognizance is taken of whether the release setting is in the correct order of setting or not.

*Chime signal.*—During the setting of the drum, contacts D13 (Figs. 27b and 13b) close when data set in seventy-five columns has not yet been read out. This will cause a circuit to complete through chime solenoid 305 to signal the operator that the drum is about full.

*Full drum signal.*—When eighty columns of the drum contain settings not read out, contacts D14 (Figs. 27a and 13b) close to energize lock magnets 145 and 148 so that no further keys may be operated until more columns become available for setting data on the drum.

*Field duplication.*—As explained in connection with Figs. 28 and 29, where a field such as field d is to be duplicated in each C card, the D card is provided with a 4 hole as shown in Fig. 28. In cases where the field is to be duplicated in only certain of the C cards, this 4 hole is not present. Instead, for the desired cards the field duplicate key 131f (Fig. 27a) is pressed to effect a setting in position 15 of the drum in the column corresponding to the first column of field d. When this setting is sensed (when the first column of field d is at the punches), the circuit will energize relay R12 (Fig. 27b) and hold through its contacts R12a. It closes its contacts R12b (Fig. 27d) to energize relay R15 and R14 to cause elevation of the duplicating brushes 101 so that the duplicate data is sensed for control of punching in the same manner as though relays R15 and R14 had been energized in response to a 4 hole in card D. Relay R12 closes its contacts R12c (Fig. 27c) so that the readout clutch solenoid 214 is energized to space the drum past the position in which the 15 setting is made.

*Intermediate field change.*—The circuits are arranged so that, when the data in intermediate field g of card M is to be suppressed and new data key set instead, the minor field f is also changed therewith. This may be illustrated by specific example. In Fig. 29 the intermediate change setting is made for the second card as shown in position 18 of drum column 52 and, when this column is sensed (to punch the letter W), a circuit is completed in Fig. 27b through the contacts 244, 245 of the 18 position to energize relay R22 which closes its contacts R22a to hold until a new card is fed.

Later in the operation, when the 1 hole in card D (first column of the minor field f) is sensed, the circuit therethrough in Fig. 27d is traceable from wire 318, plate 174, wiper 194, strip 185 of column 50, 1 conductor 188, wire 322, contacts R22b (shifted) and wire 323 to relay R19 and line 291. No circuit is completed to relay R15 so that, when relay R19 is deenergized, the readout circuits will be effective to read columns 77 to 80 of the drum and punch the data 9999 in field f. When the 2 hole in card D is sensed (column 54) the circuit therethrough is traceable from wire 318, plate 174, wiper 194, strip 185 of column 54, 2 conductor 188, wire 324, contacts R22c (shifted), wire 323 and relay R19 to line 291. Again, relay R15 is not energized so that the readout circuits will be effective to read columns 81 to 84 of the drum and punch the data 8888 in field g. When the 3 hole in card D is sensed (column 58) the circuit is traceable from wire 318, plate 174, wiper 194, strip 185 of column 58, 3 conductor 188, wire 325, contacts R22d (shifted), contacts R21b (not shifted), wire 315 and relay R15 to line 291. In the familiar manner this results in energization of relay R14 so that the punch selected circuits are now shifted from control by the drum to control by card M and the data in major field h of card M will be duplicated in field h of card C.

*Major field change.*—The circuits are arranged so that, when the data in major field h of card M is to be suppressed and new data key set therefor, the minor field f and the intermediate field g are also automatically changed therewith. For this operation the operator will momentarily close switch 88e (Fig. 27a) preferably while keying the data for field a. This will cause energization of the 17 and 18 magnets 246 and setting of their drum contacts. Obviously, as noted in Fig. 27a the same result is obtained by operating both keys 131a and 131b. If this were done at the time of setting column 2 of the drum (Fig. 29), the two settings 17 and 18 would be in this column. Later in the operation, when the 1, 2 and 3 holes in card D are sensed, the energized condition of relays R21 and R22 (Fig. 29d) and the shifted condition of their contacts will direct all the circuits from wire 322, 324 and 325 to relay R19 and the relay R15 will not be picked up, so that duplication is suppressed from all three fields f, g and h of card M.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a card punching machine having mechanism for feeding a card step by step past a row of punches, and operating means for the punching, each punch operation causing a stepping of the card, in combination with a storage mechanism settable to represent data to be punched, a pattern card perforated to represent data to be punched, means controlled by the storage mechanism for controlling the operating means of the punches to punch data in successive card columns, a control element coordinated with the card feeding mechanism, means controlled by the control element when a predetermined card column is in punching position for interrupting control by said storage mechanism and initiating control of punching by the pattern card, and further means controlled by said control element when a subsequent predetermined card column is in punching position for interrupting control by said pattern card and initiating control of punching by the storage mechanism.

2. The invention set forth in claim 1, in which presettable means is provided and means controlled thereby to render said interrupting means ineffective whereby the pattern card is prevented from controlling punching.

3. In a card punching machine, a set of punches, actuating means therefor, means for feeding a record card past said punches column by column, a data receiving device having columns of data receiving positions, readin and readout mechanism therefor, a set of keys, repeated operation of said keys causing said readin mechanism to enter data in columns of the device in succession, said readout mechanism being controlled by the receiving device to operate the punch actuating means under control of the data entered column by column, and means controlled by the data receiving device immediately upon entry of data in a single column thereof for rendering said readout means effective.

4. In a card punching machine, a set of punches, actuating means therefor, means for feeding a record card past said punches column by column, a data receiving device having columns of data receiving positions, readin and readout mechanism therefor, a set of keys, repeated operation of said keys causing said readin mechanism to enter data in columns of the device in succession, said readout mechanism being controlled by the receiving device to operate the punch actuating means under control of the data entered column by column, means controlled by the data receiving device immediately upon entry of data in a single column thereof for rendering said readout means effective and control means effective when a predetermined column has been read out for rendering said readout means ineffective until a plurality of columns subsequent to said predetermined column have received entries.

5. The invention set forth in claim 4 in which settable means is provided and effective to determine the number of columns for which the readout means is to remain ineffective.

6. In a card punching machine, a set of punches, actuating means therefor, means for feeding a record card past said punches column by column, a data receiving device having columns of data receiving positions, readin and readout mechanism therefor, a set of keys, repeated operation of said keys causing said readin mechanism to enter data in columns of the device in succession, said readout mechanism being controlled by the receiving device to operate the punch actuating means under control of the data entered column by column, a settable device effective when set in one position to cause the readout means to operate upon entry of data in a single column of the data receiving device, and effective when set in another position to delay the operation of the readout means until data has been entered in a selected number of columns of the data receiving device.

7. In a card punching machine, a set of punches, actuating means therefor, means for feeding a record card past said punches column by column, a data receiving device having columns of data receiving positions, readin and readout mechanism therefor, a set of keys, repeated operation of said keys causing said readin mechanism to enter data in columns of the device in succession, said readout mechanism being controlled by the receiving device to operate the punch actuating means under control of the data entered column by column, means controlled by the data receiving device after a predetermined number of entries has been made for rendering said readout means effective, means controlled by the data receiving device when a predetermined number of entires are contained in the device that have not been read out for signaling such fact, and further means controlled by the data receiving device when a still greater number of entries are contained in the device that have not been read out for preventing further entries.

8. In a card punching machine, a set of punches actuating means therefor, means for feeding a record card past said punches column by column, means for ejecting said card, means for entering a card into said feeding means, a data receiving device having columns of data receiving positions, readin and readout mechanism therefor, a set of keys, repeated operation of said keys causing said readin mechanism to enter data representative of punching, feeding or ejecting operations in columns of the device in succession, said readout mechanism being controlled by the receiving device to operate the punch actuating means, the feeding and ejecting means to perform the represented functions in accordance with the order of their entry, means controlled by the data receiving device after a predetermined plurality of entries has been made, or after a single entry has been made, for rendering the readout means effective, and control means for selecting under which condition the readout means shall operate.

9. In a machine of the class described, a storage drum having columns of entry receiving positions spaced around the drum, readin devices, keys for controlling the same, stepping mechanism for the drum, operation of certain of said keys being effective to cause the readin device to effect a setting representative of a selected machine operation in a column of the drum and to cause the stepping mechanism to advance the drum to render the next column responsive to the readin device, operation of certain others of said keys being effecitve to cause only the readin device to function whereby at least two entries may be made in a column of the drum, a readout device controlled by the columns of entry receiving positions in succession, a plurality of machine function controlling devices selectively controlled by the readout device, and means operative as an incident to the operation of each controlling device for causing the readout device to cooperate with the next successive columns of entry receiving positions.

10. In a machine of the class described, a storage drum having columns of entry receiving positions spaced around the drum, readin devices, keys for controlling the same, stepping mechanism for the drum, each key operation being effective to cause the readin device to effect a setting representative of a selected machine operation in a column of the drum and to cause the stepping mechanism to advance the drum to render the next column responsive to the readin device, a readout device having a home position in line with the readin device and advanced with the drum by said stepping mechanism in response to the operation of the keys, control means effective after a predetermined number of columns has received entries for causing the readout device to return to home position step by step, a plurality of machine functions controlling devices selectively controlled by the readout device in accordance with the entries on the drum as the readout device is stepped back to home position, an error key, and means controlled thereby when the readout device has advanced with the drum any number of steps less than said predetermined number for causing the readout device to step to home position and for suppressing the operation of said machine control devices during said return to home positions, whereby the data entered will be ineffective for controlling machine functions.

11. In a card punching machine having mechanism for feeding a card step by step past a row of punches, and operating means for the punches, each punch operation causing a stepping of the card, in combination with a storage mechanism settable to represent data to be punched, means controlled by the storage mechanism for controlling the operating means of the punches to punch data in successive card columns, a control element operative when the card presents a predetermined column to the row of punches, a second control element operative when the storage mechanism has controlled the punches for a predetermined number of operations, and means jointly controlled by said control elements when both are operated concurrently for releasing the card.

12. In a machine of the class described having a card carriage, means for advancing said carriage step by step, means for releasing said carriage for uninterrupted movement, in combination with a storage mechanism having columns of data receiving positions settable to represent data or a releasing function, means for reading the columns in succession, each data setting causing a step of advance of the carriage, means controlled by the carriage only when it is in a predetermined position and the release setting of the storage mechanism is read while the carriage is in said predetermined position for operating said release mechanism.

13. The invention set forth in claim 12, in which a signal is provided and controlled by the carriage to effect an indication when the carriage is in said predetermined position and the reading means is reading a column other than the one containing a release setting.

14. In a machine of the class described having a card carriage, means for advancing the carriage step by step, means for releasing the carriage for uninterrupted advance, a storage mechanism, means controlled thereby for causing operation of said step-by-step advancing means and then operation of said releasing means, and means controlled by the carriage for rendering said releasing means effective only when the carriage is in a predetermined position.

15. In a machine of the class described having a set of punches, a carriage supporting a pattern card containing three fields of designations relating to minor, intermediate and major control data, means for reading said fields in succession and means controlled by said reading means for causing operation of the set of punches accordingly, in combination with a trio of keys and each field, means controlled by one of said keys when operated prior to the reading of the said fields for suppressing the reading of the minor field, means controlled by the second key for suppressing the reading of the minor and intermediate fields, and means controlled by the third key for suppressing the reading of all three fields.

16. In a card punching machine having a row of punches, a carriage for supporting a record card for movement past said row of punches, escapement mechanism for the carriage, operating means for the punches, each operation of the punches causing an operation of said escapement mechanism, in combination with a storage mechanism, means controlled thereby for rendering said punch operating means effective, and further means controlled thereby for rendering said escapement mechanism operative independently of the punching mechanism to cause the card to traverse the set of punches without being punched.

17. In a card punching machine having a row of punches, a carriage for supporting a record card for movement past said row of punches, escapement mechanism for the carriage, operating means for the punches, each operation of the punches causing an operation of said escapement mechanism, in combination with a storage mechanism, means controlled thereby for rendering said punch operating means effective, further means controlled by the storage mechanism for initiating a succession of repeated operation of said escapement mechanism independently of the punching mechanism, and means controlled by the carriage for terminating said escapement operation when the carriage reaches a predetermined position with respect to the set of punches.

18. In a card punching machine, a punch operating magnet, a pattern card having data recorded therein, sensing means therefor, a storage device having data set therein, sensing means therefor, a circuit connection between the pattern card sensing means and said magnet, a second circuit connection between the storage device sensing means and said magnet, normally effective means for sending an electrical impulse through said second circuit connection to energize the magnet in accordance with the data in the storage device, a relay, means controlled thereby for preventing said impulse sending means from sending an impulse through the said second circuit connection and for causing it to send an impulse through the first named circuit connection to energize the magnet in accordance with data in the pattern card, and means controlled by said storage device upon sensing a predetermined setting therein for operating said relay.

19. In a machine of the class described, a set of data recording devices, a first data containing device, a second data containing device, means for repeatedly sensing said first data containing device, and controlling said recording devices in accordance with the data sensed, means for repeatedly sensing said second data containing device, and means controlled by the first named sensing means upon sensing a predetermined position therein, for causing the second sensing means to control the recording devices in accordance with the data sensed in the second data containing device and for preventing control of the reading devices by the first data containing device.

20. In a key controlled punching machine, a resilient contact blade having a free and a latched position, a member normally out of engagement with the blade and movable into position to engage the control blade, move it into and hold it in latched position, key controlled means for acting upon said member to cause it to engage the control blade to represent an entry of data, readout elements for concurrently engaging the blade and member, a punch magnet and a circuit for operating the same completed upon engagement of said readout elements with said blade and member.

21. In a key controlled punching machine, a row of resilient contact blades, a member adjacent to each blade and insulated therefrom, an interposer having a normal and a shifted position adjacent to each member and blade, a common actuator for moving all the interposers against the members and blades, key controlled means for selectively shifting the interposers and concurrently operating said actuator, said action causing a selected member to engage its related blade and maintain engagement therewith, readout elements for engaging said blade and member, a punch magnet and a circuit for operating the same completed upon engagement of said readout elements with a member and its engaged blade.

22. The invention set forth in claim 21 in which movement of the actuator will cause any non-shifted interposer to engage the related blade and disengage it from its related member.

REYNOLD B. JOHNSON.

REFERENCES CITED

The following references are of record in the file of this patent:

UNITED STATES PATENTS

| Number | Name | Date |
|---|---|---|
| 2,343,414 | Johnson | Mar. 7, 1944 |
| 2,217,209 | Von Pein | Oct. 8, 1940 |